United States Patent
Yan et al.

(10) Patent No.: US 11,968,028 B2
(45) Date of Patent: Apr. 23, 2024

(54) SATELLITE NETWORK COMMUNICATION METHOD, RELATED APPARATUS, AND SYSTEM

(71) Applicant: HUAWEI TECHNOLOGIES CO., LTD., Guangdong (CN)

(72) Inventors: Xueqiang Yan, Shanghai (CN); Rongdao Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 417 days.

(21) Appl. No.: 17/346,658

(22) Filed: Jun. 14, 2021

(65) Prior Publication Data

US 2021/0306069 A1 Sep. 30, 2021

Related U.S. Application Data

(63) Continuation of application No. PCT/CN2019/122257, filed on Nov. 30, 2019.

(30) Foreign Application Priority Data

Dec. 14, 2018 (CN) .......................... 201811534818.6

(51) Int. Cl.
*H04W 8/18* (2009.01)
*H04B 7/185* (2006.01)
(Continued)

(52) U.S. Cl.
CPC .......... *H04B 7/18513* (2013.01); *H04W 8/18* (2013.01); *H04W 8/26* (2013.01); *H04W 60/00* (2013.01)

(58) Field of Classification Search
CPC .... H04B 7/18513; H04W 60/00; H04W 8/26; H04W 8/18
See application file for complete search history.

(56) References Cited

U.S. PATENT DOCUMENTS 5,563,606 A * 10/1996 Wang ................... H04B 7/1855
455/13.3
6,456,234 B1 * 9/2002 Johnson ................ H04W 4/027
340/988
(Continued)

FOREIGN PATENT DOCUMENTS

CN 102025588 A 4/2011
CN 102118456 A 7/2011
(Continued)

OTHER PUBLICATIONS

Duan, "Research on Distributed Routing Algorithm in Satellite Networks Based on Leo Polar Orbits Constellation," Beijing University of Posts and Telecommunications, Apr. 2015, 107 pages (with English abstract).

(Continued)

*Primary Examiner* — Hai V Nguyen
(74) *Attorney, Agent, or Firm* — Fish & Richardson P.C.

(57) ABSTRACT

Examples in this application disclose satellite network communication methods, communications apparatuses, and communications systems. One example method includes determining, by a user device, address information of the user device, where the address information includes a second sub-area identifier and a user device identifier (UDID) of the user device, and the second EID indicates a second sub-area which the user device is currently located in, and the second sub-area is one of a plurality of sub-areas divided from earth surface, and sending, by the user device, the address information to a first satellite.

30 Claims, 21 Drawing Sheets

(51) Int. Cl.
  *H04W 8/26* (2009.01)
  *H04W 60/00* (2009.01)

(56) References Cited

U.S. PATENT DOCUMENTS

| | | | | |
|---|---|---|---|---|
| 10,151,593 | B2* | 12/2018 | Tashiro | G08G 1/0129 |
| 10,313,440 | B2* | 6/2019 | Aihara | G16Z 99/00 |
| 10,853,456 | B1* | 12/2020 | Crawforth | H04L 65/75 |
| 11,581,942 | B2* | 2/2023 | Ryu | H04W 48/00 |
| 11,641,564 | B2* | 5/2023 | Ryu | G01S 19/47 |
| | | | | 455/456.1 |
| 11,671,892 | B2* | 6/2023 | Vivanco | H04W 36/30 |
| | | | | 370/331 |
| 11,683,180 | B1* | 6/2023 | Crawforth | H04L 9/0637 |
| | | | | 713/164 |
| 11,755,693 | B1* | 9/2023 | Crawforth | H04L 9/321 |
| | | | | 713/164 |
| 2002/0142781 | A1* | 10/2002 | Wiedeman | H04B 7/18547 |
| | | | | 455/456.5 |
| 2003/0073435 | A1 | 4/2003 | Thompson et al. | |
| 2008/0189028 | A1* | 8/2008 | Nair | H04W 4/02 |
| | | | | 455/456.1 |
| 2010/0265879 | A1 | 10/2010 | Foxworthy et al. | |
| 2016/0249176 | A1* | 8/2016 | Pearce | G01S 5/0252 |
| 2016/0308969 | A1* | 10/2016 | Aihara | G06F 16/951 |
| 2017/0041148 | A1* | 2/2017 | Pearce | H04L 63/126 |
| 2017/0074670 | A1* | 3/2017 | Tashiro | G01C 21/3492 |
| 2020/0313756 | A1* | 10/2020 | Prinz | H04B 7/18513 |
| 2021/0037496 | A1* | 2/2021 | Ryu | H04B 7/195 |
| 2021/0051444 | A1* | 2/2021 | Ryu | H04W 4/029 |
| 2021/0203413 | A1* | 7/2021 | Hamet | H04B 7/18556 |
| 2022/0046424 | A1* | 2/2022 | Edge | H04W 12/122 |
| 2022/0094430 | A1* | 3/2022 | Edge | H04B 7/18547 |
| 2022/0264278 | A1* | 8/2022 | Edge | H04L 65/1069 |
| 2022/0322268 | A1* | 10/2022 | Edge | H04B 7/18565 |
| 2023/0006741 | A1* | 1/2023 | Lv | H04J 14/0227 |
| 2023/0092925 | A1* | 3/2023 | Wang | H04B 7/18547 |
| | | | | 455/456.1 |
| 2023/0180167 | A1* | 6/2023 | Ryu | H04W 60/00 |
| | | | | 455/435.1 |
| 2023/0198611 | A1* | 6/2023 | Ryu | H04W 76/25 |
| | | | | 370/316 |
| 2023/0252447 | A1* | 8/2023 | Borras | G06Q 20/3224 |
| | | | | 705/13 |
| 2023/0276199 | A1* | 8/2023 | Ryu | H04W 60/04 |
| | | | | 455/456.1 |

FOREIGN PATENT DOCUMENTS

| | | |
|---|---|---|
| CN | 104796187 A | 7/2015 |
| CN | 106533536 A | 3/2017 |
| CN | 106549703 A | 3/2017 |
| CN | 107509203 A | 12/2017 |
| CN | 107580365 A | 1/2018 |
| CN | 108881029 A | 11/2018 |
| CN | 108780155 B | 3/2021 |
| JP | 2002344906 A | 11/2002 |
| WO | 2016064700 A2 | 4/2016 |

OTHER PUBLICATIONS

Office Action issued in Chinese Application No. 201811534818.6 dated Oct. 22, 2020, 9 pages.

Extended European Search Report issued in European Application No. 19895553.6 dated Dec. 15, 2021, 12 pages.

Office Action issued in Chinese Application No. 201811534818.6 dated Oct. 26, 2021, 6 pages (with English translation).

* cited by examiner

SATELLITE NETWORK COMMUNICATION METHOD, RELATED APPARATUS, AND SYSTEM

CROSS-REFERENCE TO RELATED APPLICATIONS

This application is a continuation of International Application No. PCT/CN2019/122257, filed on Nov. 30, 2019, which claims priority to Chinese Patent Application No. 201811534818.6, filed on Dec. 14, 2018. The disclosures of the aforementioned applications are hereby incorporated by reference in their entireties.

TECHNICAL FIELD

This application relates to the field of communications technologies, and in particular, to a satellite network communication method, a related apparatus, and a system.

BACKGROUND

A future 5th generation (5G) mobile communications system and a 5G evolved network need to meet service requirements in various industries and provide wider service coverage. A current terrestrial mobile communications network has a limited coverage capability, and cannot satisfy people's requirements for obtaining information at any time and any place. In addition, providing ultra-wide coverage in a base-station-based coverage mode faces great challenges in terms of costs and feasibility in scenarios such as in a remote area, a desert, an ocean, and in the air.

Compared with a conventional terrestrial mobile communications system, a satellite communications system provides a wider coverage area, and communication costs of the satellite communications system is not affected by a transmission distance. Therefore, the satellite communications system can overcome natural geographical obstacles such as oceans, deserts, and mountains. To overcome a deficiency of the conventional terrestrial mobile communications network, satellite communication may serve as an effective supplement to the conventional terrestrial mobile communications network.

Based on different orbit heights, satellite communications systems may be classified into the following three types: a high elliptical orbit satellite communications system, also referred to as a geostationary earth orbit (GEO), a medium earth orbit (MEO) satellite communications system, and a low earth orbit (LEO) satellite communications system. A GEO satellite is also referred to as a geostationary orbit satellite and has an orbit height of 35786 km. A main advantage of the GEO satellite is as follows: The GEO satellite is stationary relative to the ground and provides a very large coverage area. A MEO satellite has an orbital height from 2000 km to 35786 km, and a relatively small quantity of satellites can provide global coverage. However, a transmission delay of the MEO satellite is larger than a transmission delay of a LEO satellite. Therefore, the MEO satellite is mainly used for positioning and navigation. A LEO (LEO) satellite has an orbit height from 300 km to 2000 km. Compared with the MEO satellite and the GEO satellite, the LEO satellite has a smaller orbit height, a shorter data transmission delay, less power loss, and lower launch costs.

In the terrestrial mobile communications system, an IP technology is an important addressing technology. Various services such as voice, data, and multimedia services can be transmitted according to an IP protocol, and an IP address is a basis of a current internet architecture. As mobile access to a network is popularized, a disadvantage of the IP technology becomes obvious. Semantic overload of an IP address occurs, in other words, the IP address not only indicates an identifier of a network node, but also indicates a position of the network node, and consequently may not support user mobility well. In addition, many well-known problems, such as security and route scalability, arise due to the semantic overload of the IP address. The existing terrestrial mobile communications network attempts to resolve a mobility problem by using a tunnel mechanism. However, as a cellular cell becomes increasingly smaller, and mobility events are increasing gradually, unbearable control plane overheads and user plane overheads are caused during use of the tunnel mechanism.

However, due to features of a satellite network, such as high-speed movement of a satellite, limited on-board processing, a dynamic topology, and frequent network switching caused by the high-speed movement of the satellite, it is inappropriate to use the IP technology as an addressing architecture of the satellite network. In addition, IP-based routing and transmission technologies used on the ground cannot be directly used for the satellite network due to the foregoing features. Therefore, a critical problem is how to design a satellite network addressing scheme and a communication method that adapt to the features of the satellite network.

SUMMARY

This application provides a satellite network communication method, a satellite network registration method, a related apparatus, a chip, a program, and a readable storage medium, to resolve a problem in a related technology. The technical solutions are as follows:

According to a first aspect, an embodiment of this application provides a satellite network communication method, where the method includes: determining user device address information of a user device, where the user device address information includes a second sub-area identifier EID and a user device identifier (UDID) of the user device, the second EID is used to indicate a second sub-area in which the user device is currently located, the second sub-area is one of a plurality of sub-areas divided from the earth surface, and the plurality of sub-areas have different EIDs; and sending, by the user device, the user device address information to a first satellite.

In a possible implementation, the method further includes: receiving satellite address information sent by the first satellite, where the satellite address information includes a first sub-area identifier EID and a satellite device identifier (SDID), the first sub-area identifier EID is used to indicate a first sub-area corresponding to an area currently covered by the first satellite, the satellite device identifier is used to indicate a network interface of the first satellite, the network interface is used for communication between the first satellite and the user device, and the first sub-area is one of the plurality of sub-areas. Optionally, the satellite device identifier may be a MAC address of a network interface of a link between the satellite and the user device. The user device may include a satellite UE, a ground station, a cellular UE, a cellular base station, or the like.

In this application, the identifier of the sub-area in which the user device is located is included in the user device address information. The identifier of the sub-area in which the user device is located is used as a part of a user device address, to identify a position of the user device, and the identifier of the sub-area corresponding to the area covered by the satellite is used as a part of a satellite address, to identify a position of the satellite. This can more flexibly adapt to high-speed mobility of the satellite and mobility of the user device on a satellite network, and the user device and the satellite can efficiently perform addressing to each other and perform bidirectional communication with each other.

In a possible implementation, the plurality of sub-areas are obtained through division based on a quantity of satellite orbits and/or a quantity of satellites in each orbit. Optionally, the quantity of satellite orbits is M, the quantity of satellites in each orbit is N, one orbit corresponds to N sub-areas, and a quantity of the plurality of sub-areas is M×N.

In a possible implementation, each sub-area has a longitude range with a size of 180°/M and a latitude range with a size of 180°/N.

In a possible implementation, EIDs of N sub-areas, in the plurality of sub-areas, corresponding to one orbit are consecutive positive integers; or EIDs of N sub-areas, in the plurality of sub-areas, corresponding to one orbit constitute an arithmetic sequence with a common difference d, where the common difference d is an integer greater than 1.

According to the foregoing sub-area division method and EID addressing method, the earth surface may be evenly divided into the sub-areas that each have a longitude range with a size of 180°/M and a latitude range with a size of 180°/N.

In a possible implementation, the user device receives a beacon message sent by the first satellite, where the beacon message includes the satellite address information of the first satellite; and the user device sends a registration request message to the first satellite, where the registration request message includes the user device address information of the user device. The method further includes: receiving a registration response message sent by the first satellite. Optionally, if the first EID of the first satellite is the same as the second EID of the user device, the user device sends the registration request message to the first satellite; or if an elevation angle between the first satellite and the user device is greater than a first threshold or reaches a maximum value, the user device sends the registration request message to the first satellite.

According to a second aspect, an embodiment of this application provides another satellite network communication method, including: determining, by a first satellite, satellite address information, where the satellite address information includes a first sub-area identifier EID, the first EID is used to indicate a first sub-area corresponding to an area currently covered by the first satellite, the first sub-area is one of a plurality of sub-areas divided from the earth surface, and the plurality of sub-areas have different EIDs; and sending the satellite address information to a user device.

Optionally, the satellite address information further includes a satellite device identifier, the satellite device identifier is used to indicate a network interface of the first satellite, and the network interface is used for communication between the first satellite and the user device. Optionally, the satellite device identifier may be a MAC address of a network interface of a link between the satellite and the user device. The user device may include a satellite UE, a ground station, a cellular UE, a cellular base station, or the like.

In this application, the identifier of the sub-area corresponding to the area covered by the satellite is used as a part of a satellite address, to identify a position of the satellite. This can more flexibly adapt to high-speed mobility of the satellite and mobility of the user device on a satellite network, and the user device and the satellite can efficiently perform addressing to each other and perform bidirectional communication with each other.

In a possible implementation, the plurality of sub-areas are obtained through division based on a quantity of satellite orbits and/or a quantity of satellites in each orbit. Optionally, the quantity of satellite orbits is M, the quantity of satellites in each orbit is N, one orbit corresponds to N sub-areas, and a quantity of the plurality of sub-areas is M×N.

In a possible implementation, each sub-area has a longitude range with a size of 180°/M and a latitude range with a size of 180°/N.

In a possible implementation, the determining satellite address information includes: determining the first EID of the first sub-area based on a mapping relationship between a satellite identifier SID of the first satellite and the EIDs of the plurality of sub-areas, where the satellite identifier SID of the first satellite is used to identify the first satellite. Optionally, the SID of the first satellite may be used for routing to another satellite, and may be used as an index of an inter-satellite routing table, to help perform addressing and routing in inter-satellite communication.

In a possible implementation, EIDs of N sub-areas, in the plurality of sub-areas, corresponding to one orbit are consecutive positive integers, and the mapping relationship is as follows $$EID_t = \left\{ \text{int}(SID/N) * N + \left[ SID + \text{int}\left(t * \frac{N}{T}\right) \bmod N \right] \bmod N \right\}$$

where $EID_t$ represents the first EID of the first sub-area corresponding to the area currently covered by the first satellite, the SID is the satellite identifier of the first satellite, SID is equal to an EID of a sub-area corresponding to an area initially covered by the first satellite, N represents a quantity of satellites in an orbit in which the satellite is located, T represents a revolution period of the first satellite, int represents a rounding operation, and mod represents a modulo operation.

In a possible implementation, EIDs of N sub-areas, in the plurality of sub-areas, corresponding to one orbit constitute an arithmetic sequence with a common difference d, where the common difference d is an integer greater than 1; and the mapping relationship is as follows:

$$EID_t = \left\{ \text{int}(SID/N/d) * N * d + \left[ SID + d * \left( \text{int}\left(t * \frac{N}{T}\right) \bmod N \right) \right] \bmod (N * d) \right\}$$

where EIDs represents the first sub-area identifier EID of the first sub-area corresponding to the area currently covered by the first satellite, SID is equal to an identifier $EID_0$ of a sub-area corresponding to an area initially covered by the first satellite, N represents a quantity of satellites in an orbit in which the first satellite is located, T represents a revolution period of the satellite in the orbit, int represents a rounding operation, and mod represents a modulo operation.

According to the foregoing sub-area division method and EID addressing method, the earth surface may be evenly divided into the sub-areas that each have a longitude range with a size of 180°/M and a latitude range with a size of 180°/N, and the satellite can calculate, in real time, the sub-area corresponding to the area currently covered by the satellite, but does not need to store an EID addressing table or a mapping relationship table in another form. Therefore, a memory space of the satellite can be greatly saved. In addition, the EID is determined through calculation in real time. A calculation delay of the satellite is far smaller than a table lookup delay of the satellite. Especially when there are a very large quantity of satellites, the delay can be greatly reduced, and operating efficiency of a system can be greatly improved.

In a possible implementation, the first satellite sends a beacon message to the user device, where the beacon message includes the satellite address information of the first satellite; the first satellite receives a registration request message sent by the user device, where the registration request message includes user device address information of the user device, the user device address information includes a second sub-area identifier EID and a user device identifier UDID of the user device, and the second EID is used to indicate a second sub-area in which the user device is currently located; and the first satellite feeds back a registration response message to the user device, where the registration response message is used to respond to the registration request message. Based on this solution, the user device can successfully implement a procedure of registering with the satellite.

In a possible implementation, if the second EID is different from the first EID, the method further includes: sending the registration request message to a neighbor satellite, where the neighbor satellite includes a second satellite, and a sub-area corresponding to an area currently covered by the second satellite is the second sub-area; and the sending the registration response message to the user device includes: receiving the registration response message sent by the second satellite, and forwarding the registration response message to the user device in the second sub-area. Based on this solution, when the sub-area corresponding to the area covered by the first satellite is different from the sub-area in which the user device is located, the first satellite may forward the registration request message, so that the user device can still successfully implement a registration process.

In a possible implementation, the method further includes: receiving a data message sent by the user device currently located in the second sub-area, where a destination address in the data message includes a third sub-area identifier EID of a third sub-area in which a target user device corresponding to the data message is located and a UDID of the target user device, and a source address in the data message includes the second EID of the second sub-area and the UDID of the user device; and
  if the third EID is the same as the second EID, sending, by the first satellite, the data message to the target user device; or
  if the third EID is different from the second EID, determining, by the first satellite based on a mapping relationship between a satellite identifier SID and the EIDs of the plurality of sub-areas, the satellite identifier SID of the third satellite that covers the third sub-area, and forwarding, by the first satellite, the data message to the third satellite, where a source address in the data message forwarded by the first satellite is updated to the SID of the first satellite and the UDID of the user device, and a destination address in the data message forwarded by the first satellite is updated to the SID of the third satellite and the UDID of the target user device.

In a possible implementation, the method further includes:
  receiving a data message sent by a source user device currently located in a third sub-area, where a source address in the data message includes a third EID of the third sub-area and a UDID of the source user device, and a destination address in the data message includes the second EID and the UDID of the user device; and
  if the third EID is the same as the second EID, sending, by the first satellite, the data message to the user device; or
  receiving a data message forwarded by the second satellite, where the data message is forwarded to the second satellite by a third satellite, a sub-area corresponding to an area currently covered by the third satellite is a third sub-area, the data message is from a source user device currently located in the third sub-area, a source address in the data message forwarded by the third satellite includes a SID of the third satellite and a UDID of the source user device, and a destination address in the data message forwarded by the third satellite includes a SID of the second satellite and the UDID of the user device; and sending, by the first satellite, the data message to the user device.

In a possible implementation, if the second EID is the same as the first EID, the method further includes:
  receiving a data message sent by the user device currently located in the second sub-area, where a destination address in the data message includes a third EID of a third sub-area in which a target user device corresponding to the data message is currently located and a UDID of the target user device, and a source address in the data message includes the second EID and the UDID of the user device; and
  if the third EID is the same as the second EID, sending, by the first satellite, the data message to the target user device; or
  if the third EID is different from the second EID, determining, by the first satellite based on a mapping relationship between a satellite identifier SID and the plurality of sub-areas, the satellite identifier SID of the third satellite, where a sub-area corresponding to an area currently covered by the third satellite is the third sub-area; and forwarding the data message to the third satellite, where a destination address in the data message is updated to the SID of the third satellite and the UDID of the target user device, and a source address in the data message is updated to the SID of the first satellite and the UDID of the user device.

In a possible implementation, if the second EID is the same as the first EID, the method further includes:
  receiving a data message sent by a source user device currently located in the first sub-area, where a source address in the data message includes the first EID and a UDID of the source user device, and a destination address in the data message includes the first EID and the UDID of the user device; or
  receiving a data message forwarded by a third satellite, where a sub-area corresponding to an area currently covered by the third satellite is a third sub-area, the data message is from a source user device currently located in the third sub-area, a source address in the data message forwarded by the third satellite is updated to a SID of the third satellite and a UDID of the source user device, and a destination address in the data message forwarded by the third satellite is updated to the SID of the first satellite and the UDID of the user device; and forwarding, by the first satellite, the data message to the user device.

According to a third aspect, an embodiment of this application provides a satellite network registration method, including: receiving, by a user device, one or more beacon messages sent by one or more satellites, where each beacon message includes satellite address information, and the satellite address information includes an EID of a sub-area corresponding to an area currently covered by a satellite; determining, by the user device, a registration satellite from the one or more satellites based on the beacon message; and sending, by the user device, a registration request message to the registration satellite, and receiving, by the user device, a registration response message sent by the registration satellite.

In a possible implementation, the registration satellite is determined based on satellite address information carried in the beacon message. Specifically, the user device determines, from a plurality of satellites, a satellite as the registration satellite, where a sub-area corresponding to an area currently covered by the satellite is the same as a sub-area in which the user device is currently located.

In a possible implementation, the beacon message further includes address information and height information of the satellite, and the address information of the satellite includes a longitude, a latitude, and a height of the satellite. The registration satellite is determined based on position information and the height information of the satellite that are carried in the beacon message. The user device may determine, from the plurality of satellites, a satellite as the registration satellite, where an elevation angle between the satellite and the user device is greater than a first threshold or reaches a maximum value.

In a possible implementation, the registration satellite is determined based on signal strength of the beacon message. The user device may determine, from the plurality of satellites, a satellite whose beacon message has signal strength greater than a second threshold or has highest signal strength, as the registration satellite.

According to a fourth aspect, an embodiment of this application provides a communications apparatus on a user device side. The apparatus may be a user device, or may be a chip in a user device. The apparatus implements a function of the user device in the first aspect or the third aspect. The function may be implemented by hardware, or may be implemented by hardware executing corresponding software. The hardware or the software includes one or more units corresponding to the foregoing function.

In a possible implementation, when the apparatus is a user device, the user device includes a processor, a transmitter, and a receiver. The processor is configured to support the user device to perform a corresponding function in the foregoing method. The transmitter and the receiver are configured to support communication between the user device and a satellite, and support sending, to the satellite, of a registration request message, a data message, or an acknowledgement message carrying user device address information. Optionally, the user device may further include a memory. The memory is configured to be coupled to the processor, and stores a program instruction and data that are necessary for the user device.

In another possible implementation, the communications apparatus includes a determining module, a sending module, and a receiving module. The determining module is configured to determine user device address information of a user device. The sending module is configured to send the user device address information, for example, send a registration request message, a data message, or an acknowledgement message carrying the user device address information. The receiving module is configured to receive satellite address information sent by a satellite, for example, receive a beacon message or a registration response message that includes the satellite address information and that is sent by the satellite.

In still another possible implementation, the communications apparatus includes a controller/processor, a memory, a modem processor, a transmitter, a receiver, and an antenna, configured to support the communications apparatus to perform a corresponding function in the method in the first aspect or the third aspect.

Any one of the foregoing processors may be a general-purpose central processing unit (CPU), a microprocessor, an application-specific integrated circuit (ASIC), or one or more integrated circuits configured to control program execution in the satellite network communication methods in the foregoing aspects.

According to a fifth aspect, an embodiment of this application provides a communications apparatus on a satellite side. The apparatus may be a satellite, or may be a chip in a satellite. The apparatus implements a function of the satellite in the second aspect. The function may be implemented by hardware, or may be implemented by hardware executing corresponding software. The hardware or the software includes one or more units corresponding to the foregoing function.

In a possible implementation, when the apparatus is a satellite, the apparatus includes a processor, a transmitter, and a receiver. The processor is configured to support the satellite to perform a corresponding function in the foregoing method. The transmitter and the receiver are configured to support communication between a user device and the satellite, and sending, to the user device, of a beacon message, a registration response message, or a data message carrying satellite address information. Optionally, the satellite may further include a memory. The memory is configured to be coupled to the processor, and stores a program instruction and data that are necessary for the satellite.

In another possible implementation, the communications apparatus includes a determining module, a sending module, and a receiving module. The determining module is configured to determine satellite address information of a satellite. The sending module is configured to send the satellite address information, for example, send a beacon message, a data message, or a registration response message carrying the satellite address information. The receiving module is configured to receive user device address information sent by a user device, for example, receive a registration request message, a data message, or a response message that includes the user device address information and that is sent by the user device.

In still another possible implementation, the communications apparatus includes a controller/processor, a memory, a modem processor, a transmitter, a receiver, and an antenna, configured to support the communications apparatus to perform a corresponding function in the method in the second aspect.

Any one of the foregoing processors may be a general-purpose central processing unit (CPU), a microprocessor, an application-specific integrated circuit (ASIC), or one or more integrated circuits configured to control program execution in the satellite network communication methods in the foregoing aspects.

According to a sixth aspect, this application provides a computer-readable storage medium. The computer-readable storage medium stores an instruction, and the instruction may be executed by one or more processors of a processing circuit. When the instruction is run on a computer, the computer is enabled to perform the method in the first aspect, the second aspect, or the third aspect.

According to a seventh aspect, a computer program product including an instruction is provided. The computer program product includes an instruction used to implement the method in any one of the first aspect to the third aspect. When the computer program product runs on a computer, the computer is enabled to perform the method in any one of the first aspect to the third aspect or the possible implementations of the first aspect to the third aspect. All or a part of the computer program product may be stored in a storage medium integrated with a processor, or all or a part of the computer program product may be stored in a storage medium located outside a processor.

According to an eighth aspect, a chip is provided, including a processor. The processor is configured to invoke an instruction stored in the memory and run the instruction, to enable a communications device on which the chip is installed to perform the methods in the foregoing aspects.

According to a ninth aspect, another chip is provided, including an input interface, an output interface, and a processor. Optionally, the another chip further includes a memory. The input interface, the output interface, the processor, and the memory are connected through an internal connection path. The processor is configured to execute code in the memory, and when the code is executed, the processor is configured to perform the methods in the foregoing aspects.

According to a tenth aspect, an apparatus is provided, configured to implement the methods in the foregoing aspects.

According to an eleventh aspect, a wireless communications system is provided. The system includes the satellite and the user device in the foregoing aspects.

An embodiment of this application further provides another chip. The chip may be a part of a user device or a satellite device. The chip includes an input interface, an output interface, and a circuit. The input interface, the output interface, and the circuit are connected through an internal connection path. The circuit is configured to perform the methods in the foregoing aspects.

DESCRIPTION OF EMBODIMENTS

Terms used in the embodiments of this application are merely used to explain specific embodiments of this application, but are not intended to limit this application.

Figure 1:
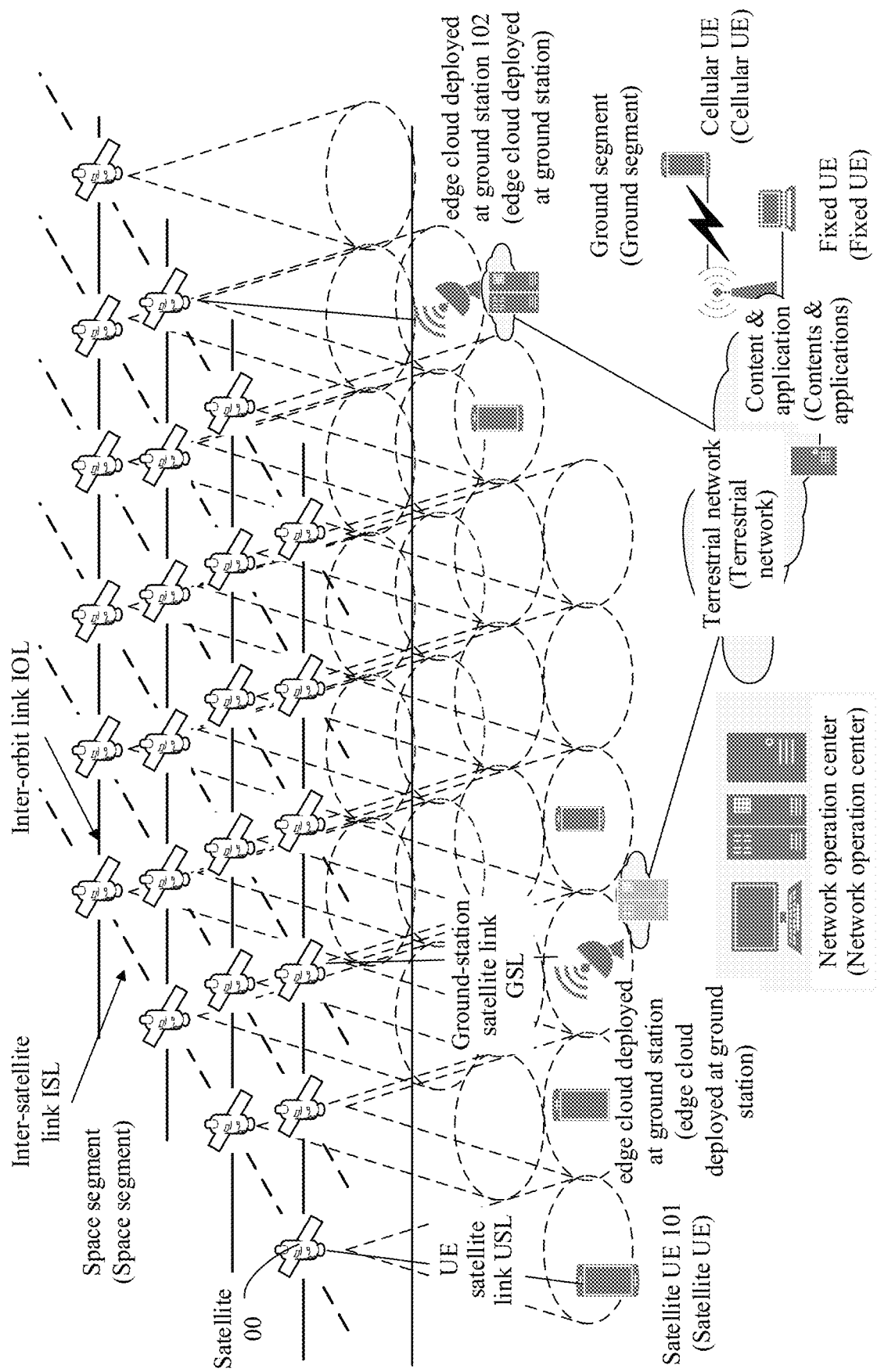
FIG. 1 shows an example satellite communications system according to an embodiment of this application.

FIG. 1 shows an example satellite communications system according to an embodiment of this application. The satellite communications system shown in FIG. 1 includes a space segment and a ground segment. The space segment includes satellites and an inter-satellite link. The ground segment includes a user terminal (UE), a ground station, a terrestrial network, a network control center, and the like. The user terminal may include a cellular UE, a satellite UE, a fixed UE, or the like.

The satellite communications system may include the following four types of communications link:

UE satellite link (USL): A UE satellite link is a bidirectional communications link between a user device in the ground segment and a satellite. Some USL links of satellites may be disabled in a polar region. A satellite may periodically enable or disable a USL.

Ground-station satellite link (GSL): A ground-station satellite link is a bidirectional communications link between a ground station (or a gateway) and a satellite. For a given constellation and given deployment of a ground station, some satellites in the constellation may connect/disconnect GSL links at regular intervals.

Inter-satellite link (ISL): An inter-satellite link is a bidirectional communications link between adjacent satellites in a same orbit. If an orbit is a circle, an ISL is usually fixed because relative positions of two satellites connected through the ISL remain unchanged.

Inter-orbit link (IOL): An inter-orbit link is a bidirectional communications link between adjacent satellites in different adjacent orbits. Two adjacent orbits intersect with each other at a position with a maximum latitude. Two satellites having a neighbor relationship turn over (a left-right relationship between the neighbor satellites is interchanged), and it is required that IOL interfaces of the two satellites rotate 180° physically to maintain the neighbor relationship and maintain an IOL link, or it is required that an IOL link is disabled and re-established between the two satellites.

In this application, for a satellite, a user device may be a user terminal that can communicate with the satellite, for example, a satellite UE, or another type of terminal that can communicate with the satellite, or may be a ground station, a cellular base station, an access point, or the like that can communicate with the satellite.

For an addressing architecture of a satellite network, naming and addressing are bases of the network architecture. Naming is a process of allocating a name to a device or an apparatus in a communications system, where the name can identify the network element. Addressing is a process of designing a communication address for the device or the apparatus. The name of the device or the apparatus is a static identifier that can uniquely identify the device or the apparatus.

On a terrestrial mobile communications network, an IP address is usually used as a digital label that is allocated to a device using the internet protocol (IP) on a network. The device on the network can perform addressing or routing based on the IP address. However, on a satellite network, if both a satellite and a user device use IP addresses for addressing, it may be difficult and less efficient to address the satellite and the user device. For example, on a satellite network shown in FIG. 1, if a connection relationship is established between a satellite 00 and a satellite UE 101 at a moment t1, and the satellite 00 moves at a high speed, the satellite 00 moves to another position that is relatively far away from the satellite UE 101 at a moment t2. When another user device, for example, an edge cloud deployed at ground station 102, needs to send information to the satellite UE 101 through the satellite network: In one case, if routing information is not updated for the satellite network in time, and routing is performed by still using routing information at the moment t1, after the satellite network finds through addressing, based on an IP address, the satellite 00 that moves to the another position, communication between the satellite network and the satellite UE 101 cannot be implemented because the satellite 00 is relatively far away from the satellite UE 101. In another case, if routing information is updated for the satellite network in time, as the satellite 00 moves, frequent network switching occurs on the user device, resulting in frequent IP address update and routing information update. Consequently, communication efficiency on the entire satellite network is relatively low.

Therefore, the embodiments of this application provide a satellite network addressing method, a satellite network registration method, and a satellite network communication method, to adapt to a high-speed mobility feature of a satellite on a satellite network, improve addressing and routing efficiency on the satellite network, and improve communication efficiency on the satellite network.

A satellite network addressing method provided in an embodiment of this application is first described. In this embodiment of this application, for a satellite on a satellite network, a satellite identifier SID (SID) may be used as a name of the satellite to identify the satellite. The SID is a static identifier. Optionally, the SID may be configured in an initial phase, and does not change with revolution of the satellite after the configuration is completed. The SID of the satellite may be a satellite identifier used for inter-satellite link ISL communication or inter-orbit link IOL communication, and may be used for inter-satellite routing. For example, the SID of the satellite may be used for inter-satellite addressing and routing. Optionally, the SID of the satellite may be an index of an inter-satellite routing table, to facilitate inter-satellite routing. Certainly, the SID of the satellite may alternatively be used as an identifier for communication through another link on the satellite network. Optionally, on the satellite network, different satellites have different SIDs. For a user device on the satellite network, a user device identifier (UDID) of the user device may be used as a name of the user device to identify the user device. In an example, the UDID of the user device may be a media access control (MAC) address, an international mobile subscriber identity (IMSI), or the like of the user device.

An earth surface sub-area identifier (Earth surface sub-area ID, EID) is used as a name of a sub-area divided from the earth surface, to identify the sub-area. The earth surface may be divided into a plurality of sub-areas. The plurality of sub-areas divided from the earth surface may be static and do not change with revolution of the satellite and movement of the user device. A sub-area may be considered as a subset of the earth surface.

On the satellite network, a satellite address (SADD) of the satellite may be used on a GSL/USL link, and may be used to address the user device and the satellite, to implement communication between the satellite and the user device. Certainly, the satellite address SADD of the satellite may alternatively be used for communication through another link on the satellite network. This is not limited in this embodiment of this application. The satellite address SADD includes an EID of a sub-area corresponding to an area currently covered by the satellite. The sub-area corresponding to the area currently covered by the satellite is one of the plurality of sub-areas divided from the earth surface. Optionally, the SADD of the satellite further includes a satellite device identifier (SDID). The satellite device identifier is used to identify a network interface, relative to a user, of the satellite, and the network interface is used for communication between the satellite and the user device. The satellite device identifier may be an identifier dependent on a device. For example, the satellite device identifier may be an identifier of a network interface used for communication between the satellite and the user device through a USL/GSL link. For example, the satellite device identifier is a media access control (MAC) address of the network interface of the satellite on the USL/GSL link. In an example, the SDID of the satellite may be used for bidirectional communication between the satellite and the user device. Optionally, different satellites have different SDIDs, to help the user device identify the different satellites. To be specific, one satellite may have two identifiers. One identifier is a SID that is oriented to the satellite and used for inter-satellite communication. The other identifier is a satellite device identifier SDID that is oriented to the user device and used for communication between the satellite and the user device.

It may be understood that the EID identifies a position of the satellite, and the satellite device identifier identifies the network interface between the satellite and the user device. In a revolution process of the satellite, the satellite address is updated in real time. For example, when the satellite detects that the sub-area corresponding to the area covered by the satellite changes, the satellite updates the satellite address.

It should be noted that, in the revolution process of the satellite, the area currently covered by the satellite may be completely the same as or partially the same as a sub-area of the earth surface. In an example, the area currently covered by the satellite is the same as a sub-area, and the sub-area is the sub-area corresponding to the area currently covered by the satellite. In another example, there is an overlapping area between the area currently covered by the satellite and a sub-area, and the area currently covered by the satellite is partially the same as the sub-area. Optionally, if a size of the overlapping area is greater than ½ of a size of the sub-area, the sub-area is the sub-area corresponding to the area currently covered by the satellite. In still another example, if a center of the area currently covered by the satellite, namely, a longitude and latitude position of the satellite, is located within a longitude and latitude range of a sub-area, the sub-area is the sub-area corresponding to the area currently covered by the satellite.

A user device address (UADD) of the user device may be used on a GSL/USL link, and is used by the satellite to address the user device, to implement communication between the user device and the satellite. Certainly, the user device address may alternatively be used on another link. The user device address includes an EID of a sub-area in which the user device is currently located and a user device identifier UDID of the user device. The sub-area in which the user device is currently located is one of the plurality of sub-areas divided from the earth surface. The UDID of the user device may be a MAC address, an IMSI, or the like of the user device. To be specific, the EID of the sub-area in which the user device is currently located identifies a position of the user device, and the UDID of the user device identifies the user device. This helps identify different user devices. Because a satellite covers a relatively large area, a UADD of a user device usually does not change frequently. When the user device moves from one sub-area to another sub-area, the UADD changes due to a change of the EID. Generally, the user device has a capability of obtaining real-time position information (for example, longitude and latitude information). Therefore, when the user device moves to another sub-area, the user device detects a change of the sub-area, and then updates the EID, to obtain an updated UADD.

It should be noted that both the user device and the satellite can determine whether the sub-area changes and update respective address information in real time. The satellite address and the user device address may be used in a process of bidirectional communication between the satellite and the user device. In an example, both the satellite and the user device periodically determine whether the sub-area changes, and update respective address information.

Optionally, the earth surface may be evenly divided into the plurality of sub-areas, or may be unevenly divided into the plurality of sub-areas. In one implementation, the earth surface may be divided into the plurality of sub-areas based on a quantity of satellite orbits and/or a quantity of satellites in each orbit. In another implementation, the earth surface may be divided into the plurality of sub-areas in another manner. For example, the earth surface may be divided based on density of user devices in a land area and an ocean area. The land area may be divided into sub-areas with a relatively small longitude and latitude range, and the ocean area may be divided into sub-areas with a relatively large longitude and latitude range. The plurality of sub-areas may not overlap with each other, or may partially overlap. Optionally, EIDs of the sub-areas may be different from each other, and may be globally unique.

In an example, the earth surface may be evenly divided into the plurality of sub-areas by longitude and latitude. The satellite orbits are polar orbits, the orbits are evenly distributed, and satellites in each orbit are also evenly distributed. The earth surface is divided into the plurality of sub-areas based on the quantity of satellite orbits and/or the quantity of satellites in each orbit. In an implementation, the earth surface is divided by longitude based on a quantity M of satellite orbits, where the M orbits correspond to 2M longitude ranges each with a size of 180°/M, and one orbit corresponds to two longitude ranges each with a size of 180°/M; and each longitude range with a size of 180°/M is divided by latitude into N/2 latitude ranges each with a size of 180°/N based on a quantity N of satellites in each orbit. In this way, the earth surface is divided into M×N sub-areas. One orbit corresponds to N sub-areas, and each sub-area has a longitude range with a size of 180°/M and a latitude range with a size of 180°/N.

The M×N sub-areas obtained through division are numbered to obtain an EID of each sub-area. In an example, EIDs of N sub-areas corresponding to one orbit are consecutive integers. In another example, EIDs of N sub-areas corresponding to one orbit constitute an arithmetic sequence whose common difference is an integer greater than 1. Certainly, the EIDs of the N sub-areas may alternatively be numbered in another form. For example, the M×N sub-areas are numbered in an irregular manner. This is not specifically limited in this embodiment of this application.

In another example, the earth surface may be unevenly divided into the plurality of sub-areas by longitude and latitude. For example, if the earth orbits are polar orbits, the orbits are unevenly distributed, and satellites in each orbit are unevenly distributed, the earth surface may be unevenly divided into the plurality of sub-areas based on the quantity of satellite orbits and/or the quantity of satellites in each orbit.

Optionally, the earth surface is statically divided into the plurality of sub-areas, and the earth surface may be statically divided after satellite configurations of the satellite network are planned in advance. The satellite configurations may include but are not limited to the quantity of satellite orbits, an orbit height, the quantity of satellites in each orbit, and the like.

Figure 2:
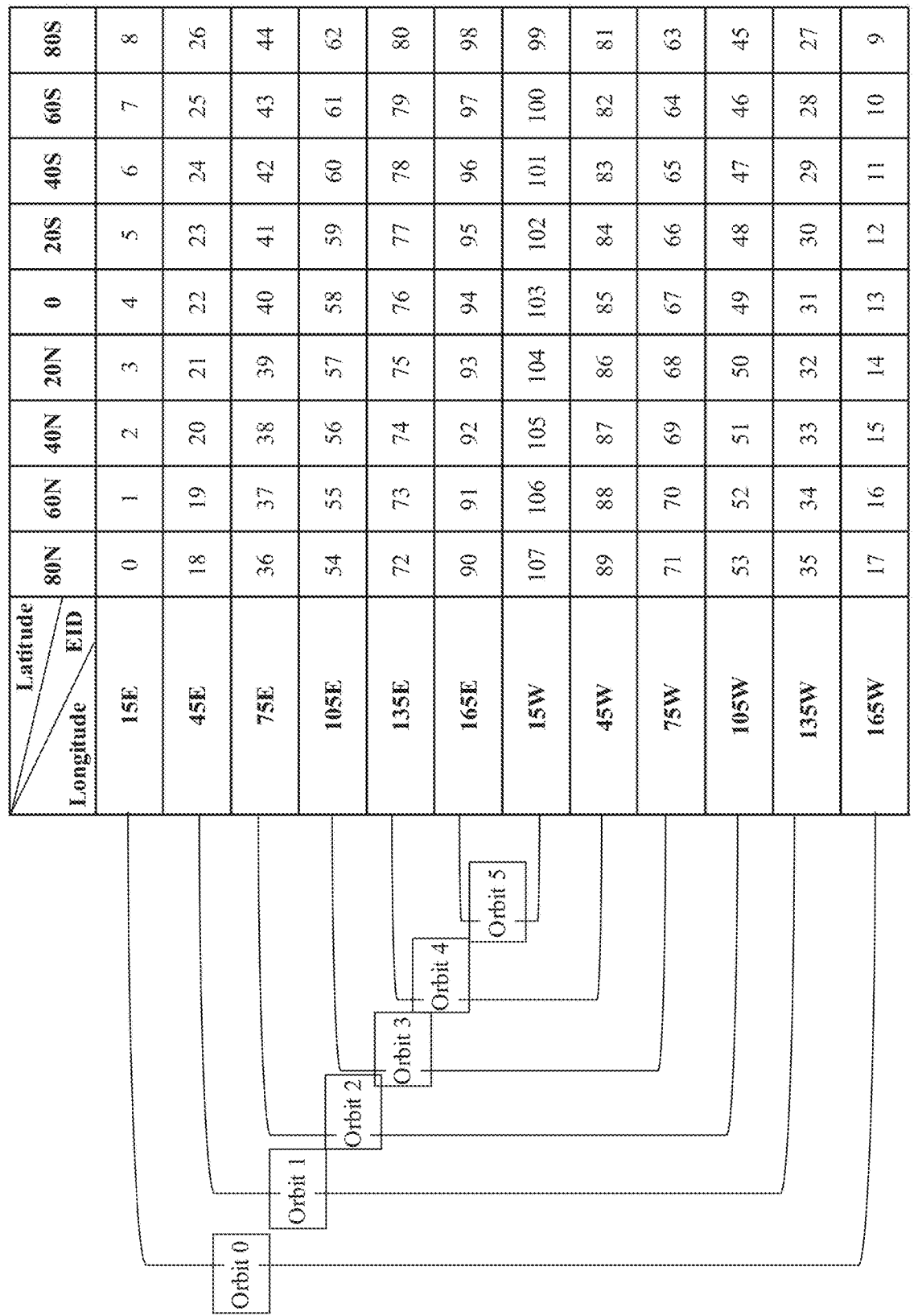
FIG. 2 shows a sub-area division and numbering example according to an embodiment of this application.

FIG. 2 is a schematic diagram of division into a plurality of sub-areas and EID encoding of the plurality of sub-areas. In the schematic diagram, it is assumed that a satellite communications system has six orbits that are evenly distributed and 18 satellites evenly revolve in each orbit, where the six orbits correspond to 12 longitude ranges each with a size of 30° on the earth surface, and each orbit corresponds to 2 longitude ranges each with a size of 300; and each longitude range with a size of 30° is divided by latitude into nine latitude ranges each with a size of 20°. The earth surface is divided into 108 sub-areas, and each sub-area has a longitude range with a size of 30° and a latitude range with a size of 20°. In a table in FIG. 2, the first row indicates a center latitude of each sub-area, and the center latitudes are successively 80° north latitude (80 degrees north latitude, 80N), 60° north latitude (60N), 40° north latitude (40N), 20° north latitude (20N), 0°, 20° south latitude (20 degrees south latitude, 20S), 40° south latitude (40S), 60° south latitude (60S), and 80° south latitude (80S). In the table in FIG. 2, the first column indicates a center longitude of each sub-area, and the center longitudes are successively 15° east longitude (15 degrees east longitude, 15E), 45° east longitude (45E), 75° east longitude (75E), 105° east longitude (105E), 135° east longitude (135E), 165° east longitude (165E), (165E), 15° west longitude (15W), 45° west longitude (45W), 75° west longitude (75W), 105° west longitude (105W), 135° west longitude (135W), and 165° west longitude (165W). In this case, a sub-area 0 corresponds to a latitude range from 90° north latitude to 70° north latitude and a longitude range from 0° east longitude to 30° east longitude. To be specific, the latitude range is from 90° north latitude to 70° north latitude, and the longitude range is from 0° east longitude to 30° east longitude.

It may be understood that the diagram of sub-area division and sub-area encoding shown in FIG. 2 is merely an example. It may be understood that the table in FIG. 2 has another representation form. For example, in the table in FIG. 2, the first row may alternatively indicate a minimum latitude of each sub-area, and the first column may indicate a minimum longitude of each sub-area. Alternatively, in the table in FIG. 2, the first row may indicate a maximum latitude of each sub-area, and the first column may indicate a maximum longitude of each sub-area. Alternatively, in the table in FIG. 2, the first row may be changed to a latitude range of each sub-area, and the first column may be changed to a longitude range of each sub-area. For example, the nine columns in the first row may be changed to 90° north latitude to 70° north latitude, 70° north latitude to 50° north latitude, 50° north latitude to 30° north latitude, 30° north latitude to 10° north latitude, 10° north latitude to 10° south latitude, 10° south latitude to 30° south latitude, 30° south latitude to 50° south latitude, 50° south latitude to 70° south latitude, and 70° south latitude to 90° south latitude. The nine rows in the first column may also be changed in a similar manner.

Figure 3:
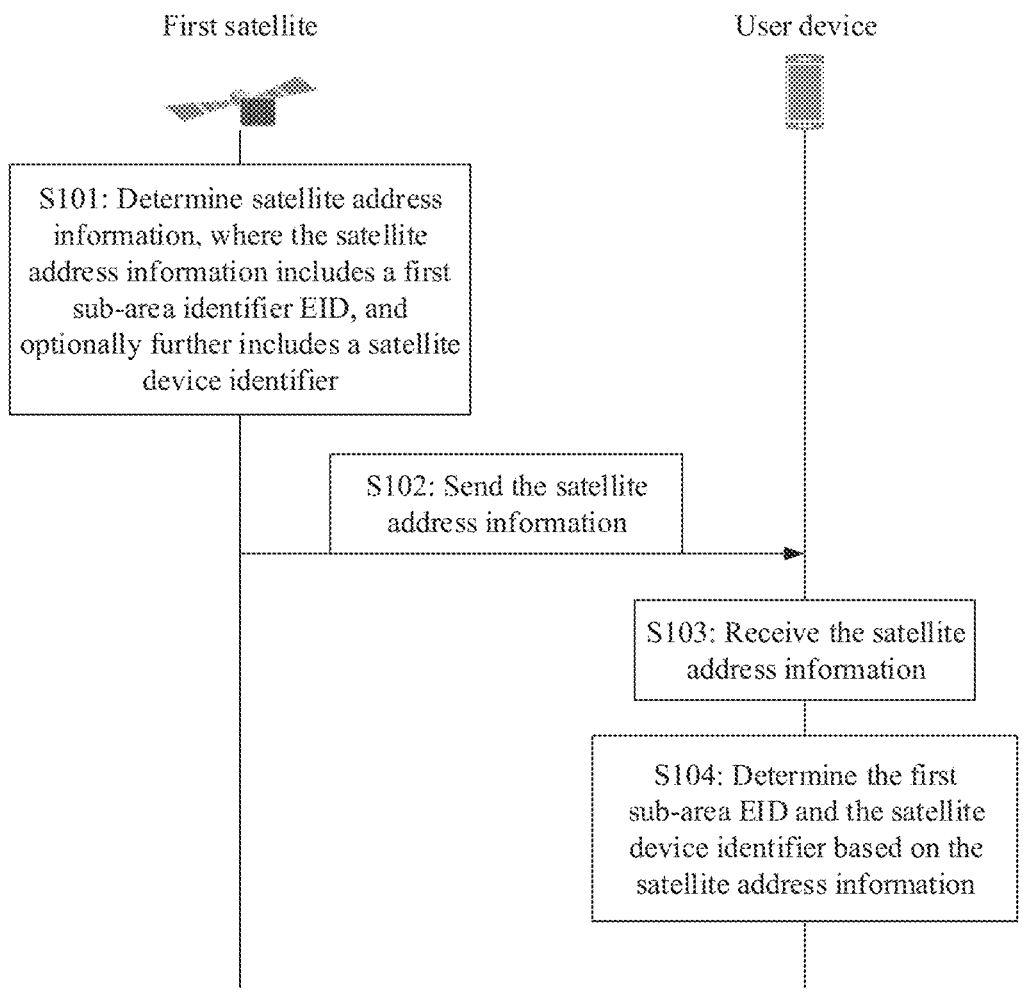
FIG. 3 is a schematic flowchart of a satellite network communication method according to an embodiment of this application.

Based on the foregoing naming method and addressing method. FIG. 3 is a schematic flowchart of a satellite network communication method according to an embodiment of this application. The satellite network communication method is specifically an address information transmission method. The method includes the following steps.

S101: A first satellite determines satellite address information, where the satellite address information includes a first sub-area identifier (Earth surface ID, EID), the first EID is used to indicate a first sub-area corresponding to an area currently covered by the first satellite, the first sub-area is one of a plurality of sub-areas divided from the earth surface, and optionally, the plurality of sub-areas have different EIDs. The first satellite may be any satellite in any orbit. For example, the first satellite may be the satellite 00 shown in FIG. 1.

Optionally, the satellite address information further includes a satellite device identifier, the satellite device identifier is used to indicate a network interface between the first satellite and a user device, and the network interface is used for communication between the first satellite and the user device.

Optionally, the satellite device identifier may be an identifier of the network interface used for communication between the first satellite and the user device. For example, the satellite device identifier may be a MAC address of a network interface of a USL/GSL, or may be a unique identifier of the first satellite, and is used for communication between the satellite and the user device.

The EID in the satellite address information is used to identify a position of the satellite, and the SDID in the satellite address information is the identifier of the network interface of the satellite. The user device may address the satellite based on the satellite address information, to implement communication between the user device and the satellite.

Specifically, the first sub-area is one of the plurality of sub-areas divided from the earth surface. Optionally, the earth surface may be evenly divided into the plurality of sub-areas, or may be unevenly divided into the plurality of sub-areas. In an implementation, the earth surface may be divided into the plurality of sub-areas based on a quantity of satellite orbits and/or a quantity of satellites in each orbit. The plurality of sub-areas may not overlap with each other, or may partially overlap. Optionally, EIDs of the sub-areas may be different from each other, and may be globally unique.

It should be noted that, in a revolution process of the satellite, the area currently covered by the satellite may be completely the same as or partially the same as a sub-area. In an example, if the area currently covered by the satellite is completely the same as a sub-area, the sub-area is the sub-area corresponding to the area currently covered by the satellite. In another example, the area currently covered by the satellite is partially the same as a sub-area, and there is an overlapping area between the area currently covered by the satellite and the sub-area. If a size of the overlapping area is greater than ½ of a size of the sub-area, the sub-area is the sub-area corresponding to the area currently covered by the satellite. In still another example, a center of the area currently covered by the satellite is located in a sub-area, and the sub-area is the sub-area corresponding to the area currently covered by the satellite.

S102: The first satellite sends the satellite address information.

Figure 4A:
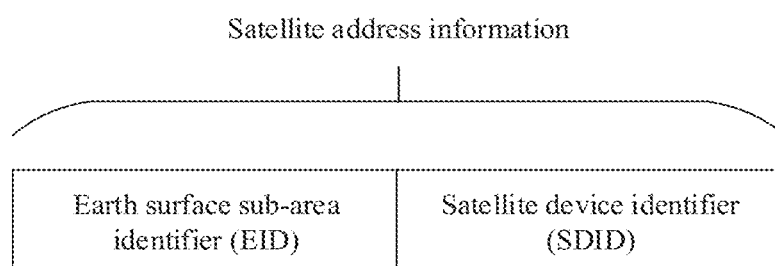
FIG. 4a is a schematic diagram of a structure of satellite address information according to an embodiment of this application.

The satellite address information may be carried in a beacon message, a data message, or another type of message. FIG. 4a shows an example structure of satellite address information. The satellite address information includes an EID of the sub-area corresponding to the area currently covered by the satellite and the satellite device identifier.

S103: The user device receives the satellite address information sent by the first satellite.

S104: Determine, based on the satellite address information, the first sub-area corresponding to the area currently covered by the first satellite, and optionally determine the satellite device identifier of the first satellite.

The user device receives the satellite address information sent by the first satellite, and parses the satellite address information, to obtain the EID of the sub-area corresponding to the area currently covered by the first satellite and the satellite device identifier of the first satellite. The user device that has obtained the satellite address information may perform bidirectional communication with the first satellite based on the satellite address information.

Optionally, in step S101, the determining the satellite address information includes determining the EID of the first sub-area corresponding to the area currently covered by the first satellite. A manner of determining the EID may include but is not limited to the following plurality of manners:

Manner 1: The EID of the first sub-area is determined based on current position information of the first satellite. The position information includes a current longitude and a current latitude of the first satellite. In an example, the first satellite determines the EID of the first sub-area based on a mapping relationship between the EIDs of the plurality of sub-areas and longitude and latitude ranges of the plurality of sub-areas. For example, the first satellite may store a table of a mapping relationship between an EID of each sub-area and a latitude range and longitude range of each sub-area, and may determine, by looking up the mapping relationship table, the EID corresponding to the currently covered area. FIG. 2 is used as an example. Assuming that the first satellite is a satellite in an orbit 0 of the six orbits and the satellite is currently located at a position of 18° east longitude (18E) and 65° north latitude (65N), the first satellite may determine, by looking up the table, that the EID of the sub-area currently corresponding to the first satellite is 1. Certainly, the first satellite may also learn an earth surface sub-area division rule and an earth surface sub-area EID numbering rule. The first satellite does not need to store the table of the mapping relationship between an EID of each sub-area and a latitude range and longitude range of each sub-area, and can directly determine, according to the earth surface sub-area division rule and the earth surface sub-area EID numbering rule, the sub-area corresponding to the area currently covered by the first satellite.

It may be understood that Manner 1 is not limited to a manner of dividing the earth surface into sub-areas and a manner of numbering EIDs for the sub-areas. To be specific, the earth surface may be divided into the sub-areas in a manner in which a quantity of orbits and a quantity of satellites in each orbit are not considered, and numbering may be performed in any manner on the EIDs of the plurality of sub-areas, provided that the latitude range and longitude range of each sub-area one-to-one correspond to the EID of each sub-area. Therefore, this EID addressing manner is more flexible. Manner 1 of determining the satellite address information has low calculation complexity, occupies fewer calculation resources, and has high flexibility.

Manner 2: The first EID of the first sub-area is determined based on a mapping relationship between a satellite identifier SID of the first satellite and the EIDs of the plurality of sub-areas. The satellite identifier SID of the first satellite is used to indicate the first satellite.

In Manner 2, during earth surface sub-area division and earth surface sub-area EID encoding, the quantity of orbits and/or the quantity of satellites in each orbit need to be considered. In an example, if the satellite orbits are polar orbits, and satellites are evenly distributed in each orbit, the earth surface is divided into the plurality of sub-areas based on the quantity of satellite orbits and the quantity of satellites in each orbit. Optionally, the earth surface is divided by longitude into 2M longitude ranges each with a size of 180°/M based on a quantity M of satellite orbits, where the M orbits correspond to 2M longitude ranges each with a size of 180°/M, and one orbit corresponds to two longitude ranges each with a size of 180°/M, and each longitude range with a size of 180°/M is divided by latitude into N/2 latitude ranges each with a size of 180°/N based on a quantity N of satellites in each orbit. In this way, the earth surface is divided into M×N sub-areas. One orbit corresponds to N sub-areas, and each sub-area has a longitude range with a size of 180°/M and a latitude range with a size of 180°/N.

The M×N sub-areas obtained through division are numbered to obtain an EID of each sub-area. Example 1: EIDs of N sub-areas corresponding to one orbit are consecutive integers. Example 2: EIDs of N sub-areas corresponding to one orbit constitute an arithmetic sequence whose common difference d is an integer greater than 1. Certainly, the EIDs of the N sub-areas may alternatively be numbered according to another method. This is not specifically limited in the embodiments of this application.

In Example 1, the EIDs of the sub-areas corresponding to one orbit are consecutive integers, and the mapping relationship between the SID of the first satellite and the EIDs of the plurality of sub-areas is as follows:

$$EID_t = \left\{ \mathrm{int}(SID/N) * N + \left[ SID + \mathrm{int}\left(t * \frac{N}{T}\right) \bmod N \right] \bmod N \right\} \quad \text{Formula (1)}$$

where $EID_t$ represents the first sub-area identifier EID of the first sub-area corresponding to the area currently covered by the first satellite, SID is equal to an identifier $EID_0$ of a sub-area corresponding to an area initially covered by the first satellite, N represents a quantity of satellites in an orbit in which the first satellite is located, T represents a revolution period of the satellite in the orbit, int represents a rounding operation, and mod represents a modulo operation.

It may be understood that because SID is equal to the identifier $EID_0$ of the sub-area corresponding to the area initially covered by the first satellite, that is, $SID=EID_0$, Formula (1) may be rewritten as follows:

$$EID_t = \left\{ \mathrm{int}(EID_0/N) * N + \left[ EID_0 \mathrm{int}\left(t * \frac{N}{T}\right) \bmod N \right] \bmod N \right\} \quad \text{Formula (2)}$$

An EID shown in FIG. 2 is used as an example. Assuming that there are 18 satellites in an orbit 0 and EIDs are successively 0, 1, 2, 3, ..., and 17 at an initial moment, SIDs of the 18 satellites in the orbit 0 are successively 0, 1, 2, 3 ...., and 17. Assuming that a moment t at which the 1st satellite (SID=0) revolves is T/N, an EID of a sub-area corresponding to an area covered by the 1st satellite (SID=0) at the moment t is 1.

In Example 2, the EIDs of the sub-areas corresponding to one orbit constitute an arithmetic sequence whose common difference d is an integer greater than 1, and the mapping relationship between the SID of the satellite and the EIDs of the plurality of sub-areas is as follows:

$$EID_t = \left\{ \mathrm{int}(SID/N/d) * N * d + \left[ SID + d * \left(\mathrm{int}\left(t * \frac{N}{T}\right) \bmod N\right) \right] \bmod (N*d) \right\} \quad \text{Formula (3)}$$

where $EID_t$ represents the first sub-area identifier EID of the first sub-area corresponding to the area currently covered by the first satellite, SID is equal to an identifier $EID_0$ of a sub-area corresponding to an area initially covered by the first satellite, N represents a quantity of satellites in an orbit in which the first satellite is located, T represents a revolution period of the satellite in the orbit, int represents a rounding operation, and mod represents a modulo operation.

It may be understood that because SID is equal to the identifier $EID_0$ of the sub-area corresponding to the area initially covered by the first satellite, that is, $SID=EID_0$, Formula (3) may be rewritten as follows:

$$EID_t = \left\{ \mathrm{int}(EID_0/N/d) * N * d + \left[ EID_0 + d * \left(\mathrm{int}\left(t * \frac{N}{T}\right) \bmod N\right) \right] \bmod (N*d) \right\} \quad \text{Formula (4)}$$

In an example, in Formula (1) to Formula (4), the revolution period T of the satellite may be as follows:

$$T = 2\pi \sqrt{\frac{(R+h)^3}{(GM)^2}} \qquad \text{Formula (5)}$$

where R represents the radius of the earth, h represents a height of the orbit, G represents the universal gravitational constant, and M represents the mass of the earth.

In still another example, the revolution period T of the satellite in Formula (1) to Formula (4) may alternatively be stored in the satellite as a constant, and does not need to be calculated by the satellite according to Formula (5). When calculating $EID_t$, the satellite directly obtains the revolution period T from a memory.

It should be noted that Formula (1) to Formula (4) may be not only used to determine, based on the SID of the satellite, the EID of the sub-area corresponding to the area currently covered by the satellite, but also used to determine, based on the EID of the sub-area corresponding to the area currently covered by the satellite, the sub-area corresponding to the area initially covered by the satellite, to determine the SID of the satellite.

In Manner 2, the satellite may obtain a one-to-one mapping between a SID and an EID based on movement regularity and movement periodicity of a satellite constellation according to Formula (1) to Formula (4), to obtain, in real time, the EID of the sub-area corresponding to the area currently covered by the satellite, but does not need to store an EID addressing table or a mapping relationship table in another form. Therefore, a memory space of the satellite can be greatly saved. In addition, in Manner 2, the EID is determined through calculation in real time. A calculation delay of the satellite is far smaller than a table lookup delay of the satellite. Especially when there are a very large quantity of satellites, the delay can be greatly reduced, and operating efficiency of a system can be greatly improved.

In this embodiment of this application, the EID of the sub-area corresponding to the satellite identifies the position of the satellite. As a part of the satellite address information, the EID can adapt to a high-speed mobility feature of the satellite on a satellite network. In addition, the satellite on the satellite communications network can update the satellite address information in real time. This reduces addressing and routing complexity and an addressing and routing delay, and improves communication stability of a satellite communications system.

Figure 5:
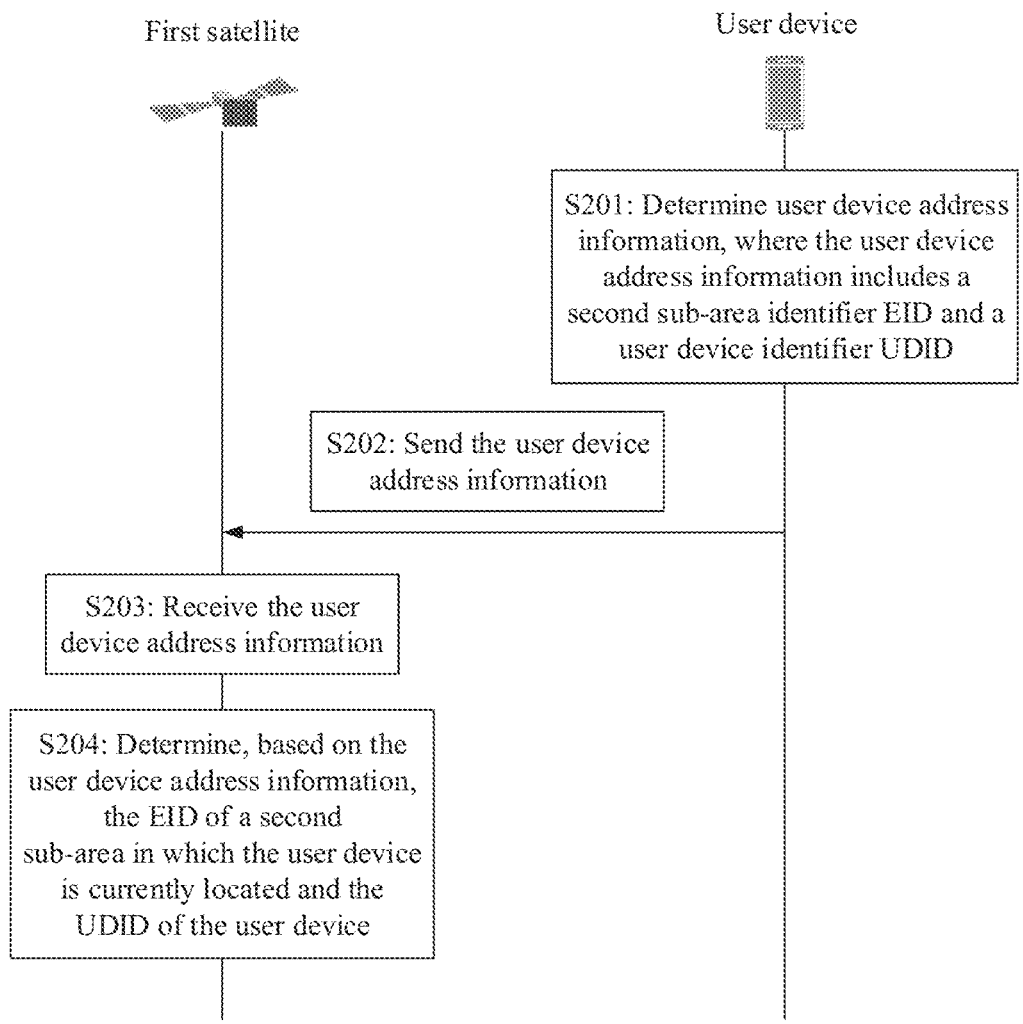
FIG. 5 is a schematic flowchart of another satellite network communication method according to an embodiment of this application.

Based on the foregoing naming method and addressing method, FIG. 5 shows another satellite network communication method according to an embodiment of this application. The satellite network communication method is specifically an address information transmission method. The method includes the following steps.

S201: A user device determines user device address (UADD) information, where the user device address information includes a second sub-area identifier (Earth surface identifier, EID) and a user device identifier UDID (User device identifier, DID) of the user device, the second sub-area EID is used to indicate a second sub-area in which the user device is currently located, and the UDID of the user device is used to identify the user device.

The UDID of the user device may be a MAC address, an IMSI, or the like of the user device. Because a satellite covers a relatively large area, a UADD of a user device usually does not change frequently. When the user device moves from one sub-area to another sub-area, the UADD changes due to a change of the EID. Generally, the user device has a capability of obtaining real-time position information (for example, longitude and latitude information). Therefore, if the user device moves to another sub-area, the user device detects a change of the sub-area, and then updates the EID, to obtain an updated UADD.

In an example, the user device may alternatively determine the EID of the second sub-area based on current position information, where the position information includes a current longitude and a current latitude of the user device. In an example, the user device determines the EID of the second sub-area based on a mapping relationship between EIDs of a plurality of sub-areas and longitude and latitude ranges of the plurality of sub-areas. For example, the user device may store, for example, a table of a mapping relationship between an EID of each sub-area and a latitude range and longitude range of each sub-area, and may determine, by looking up the mapping relationship table, the EID of the sub-area in which the user device is currently located. FIG. 2 is used as an example. Assuming that the user device is currently located at a position of 80° east longitude (80E) and 85° north latitude (85N), the user device may determine, by looking up the table, that the EID of the sub-area in which the user device is currently located is 36.

It may be understood that a manner of determining the EID by the user device is not limited to a manner of dividing the earth surface into sub-areas and a manner of encoding EIDs of the sub-areas. To be specific, the earth surface may be divided into the sub-areas in a manner in which a quantity of orbits and a quantity of satellites in each orbit are not considered, and addressing may be performed in any manner on the EIDs of the plurality of sub-areas obtained through division, provided that the latitude range and longitude range of each sub-area one-to-one correspond to the EID of each sub-area. Therefore, this manner is more flexible.

Figure 4B:
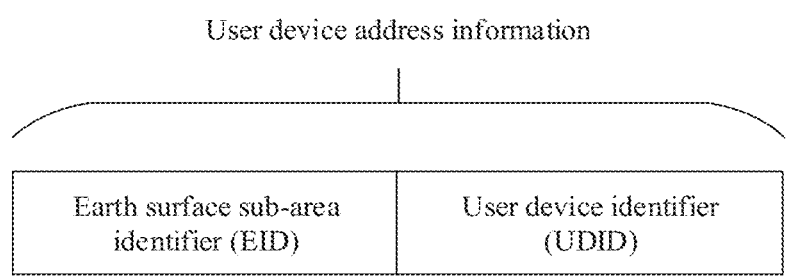
FIG. 4b is a schematic diagram of a structure of user device address information according to an embodiment of this application.

In an example, a structure of the user device address information may be shown in FIG. 4b, and the user device address information includes the earth surface sub-area EID and the user device identifier UDID of the user device.

S202: Send the user device address information to a first satellite.

The user device address information may be carried in a data message, or may be carried in a registration request message, or another type of message. The first satellite determines address information of a transmit end of each of these messages, to facilitate addressing and bidirectional communication between the satellite and the user device.

S203: The first satellite receives the user device address information.

S204: The first satellite determines, based on the user device address information, the EID of the second sub-area in which the user device is located at a current moment and the device ID of the user device.

The user device on a satellite communications network may update address information of the user device in real time based on the user device address information. This can adapt to a mobility feature of the satellite, a dynamic topology feature, and the like, and improve communication stability of a satellite communications system.

Figure 6A:
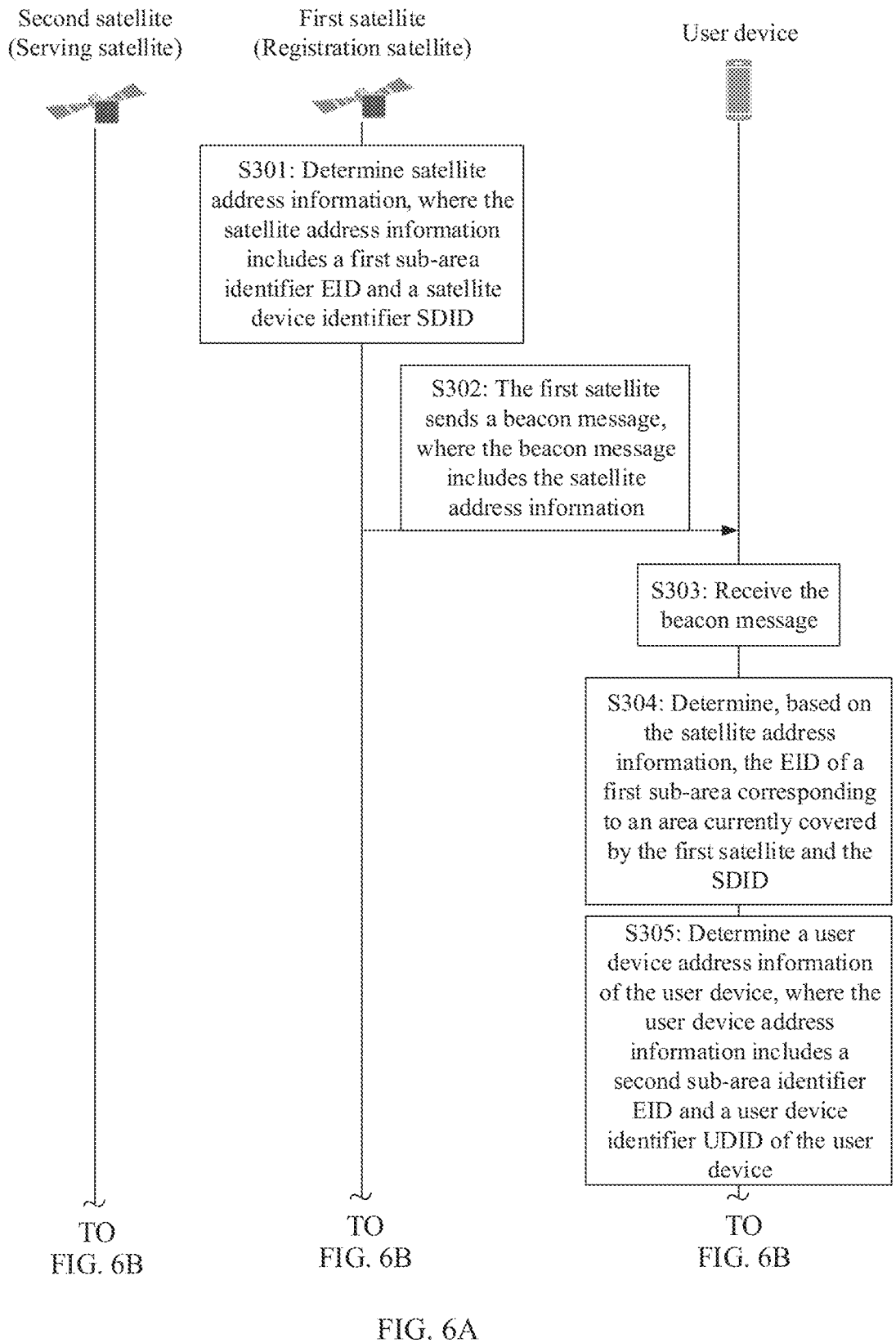
FIG. 6A and FIG. 6B are a schematic flowchart of a satellite network registration method according to an embodiment of this application.
Figure 6B:
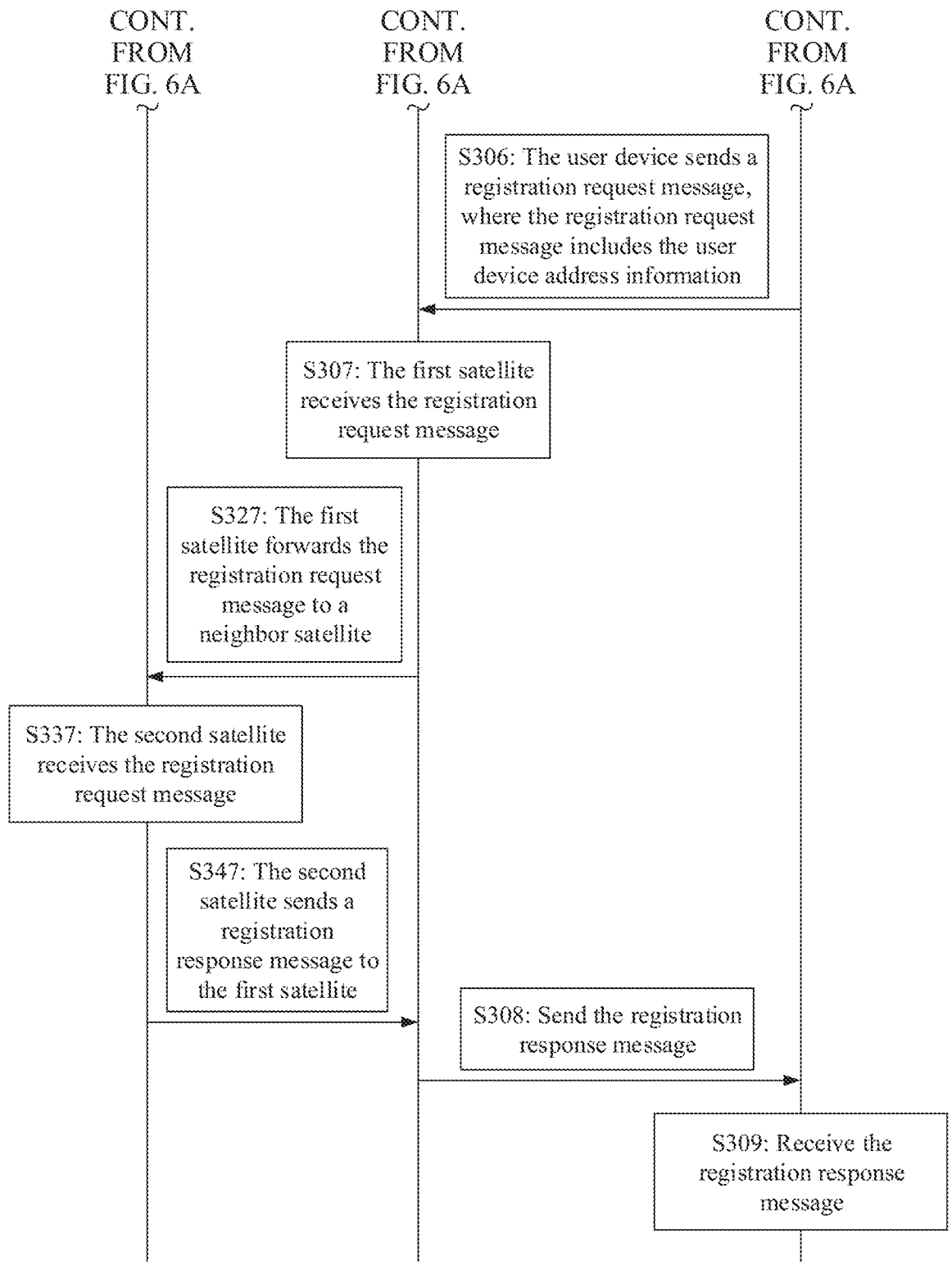

Based on the foregoing naming method and addressing method, FIG. 6A and FIG. 6B are a schematic flowchart of a satellite network registration method according to an embodiment of this application. The method includes the following steps.

S301: A first satellite determines satellite address information, where the satellite address information includes a first sub-area identifier (Earth surface ID, EID), and the first sub-area EID is used to indicate a first sub-area corresponding to an area that is covered by the first satellite at a current moment; and optionally, the satellite address information further includes a satellite device identifier (SDID), and the satellite device identifier is used to indicate a network interface between the first satellite and a user device.

Step S301 is similar to step S101. Details have been described in step S101, and therefore are not described herein again.

S302: The first satellite sends a beacon message, where the beacon message includes the satellite address information.

The satellite broadcasts the beacon message in a coverage area of the satellite through a USL/GSL link. Optionally, the satellite may periodically broadcast the beacon message through the USL/GSL link.

The beacon message includes the satellite address information. Optionally, the beacon message may further include other information about the first satellite, for example, a latitude and a longitude of the first satellite, and may further include a height of the first satellite. The user device may obtain address information and/or other information in the beacon message, so that the user device can determine, based on the information, whether to access the satellite. For example, the user device may determine a registration satellite of the user device based on the satellite address information and/or the longitude and the latitude. It should be noted that, for ease of description, a satellite indicated by a destination address to which the user device sends a registration request message is referred to as the registration satellite. It may be understood that the satellite may have another name. This is not limited in this embodiment of this application.

S303: The user device receives the beacon message.

The user device receives the beacon message broadcast by the satellite, and obtains the satellite address information of the first satellite from the broadcast beacon message. Optionally, the user device may further obtain information such as the longitude, the latitude, and the height of the satellite, or other signaling information.

S304: The user device determines, based on the satellite address information, the EID of the first sub-area corresponding to the area currently covered by the first satellite and the satellite device identifier SDID.

Step S304 is similar to step S104. Details have been described in step S104, and therefore are not described herein again.

S305: The user device determines user device address information, where the user device address information includes a second sub-area identifier (Earth surface identifier, EID) and a user device identifier UDID (UDID) of the user device, the second sub-area EID is used to indicate a second sub-area in which the user device is currently located, and the UDID of the user device is used to identify the user device.

Step S305 is similar to step S201. Details have been described in step S201, and therefore are not described herein again.

Figure 7:
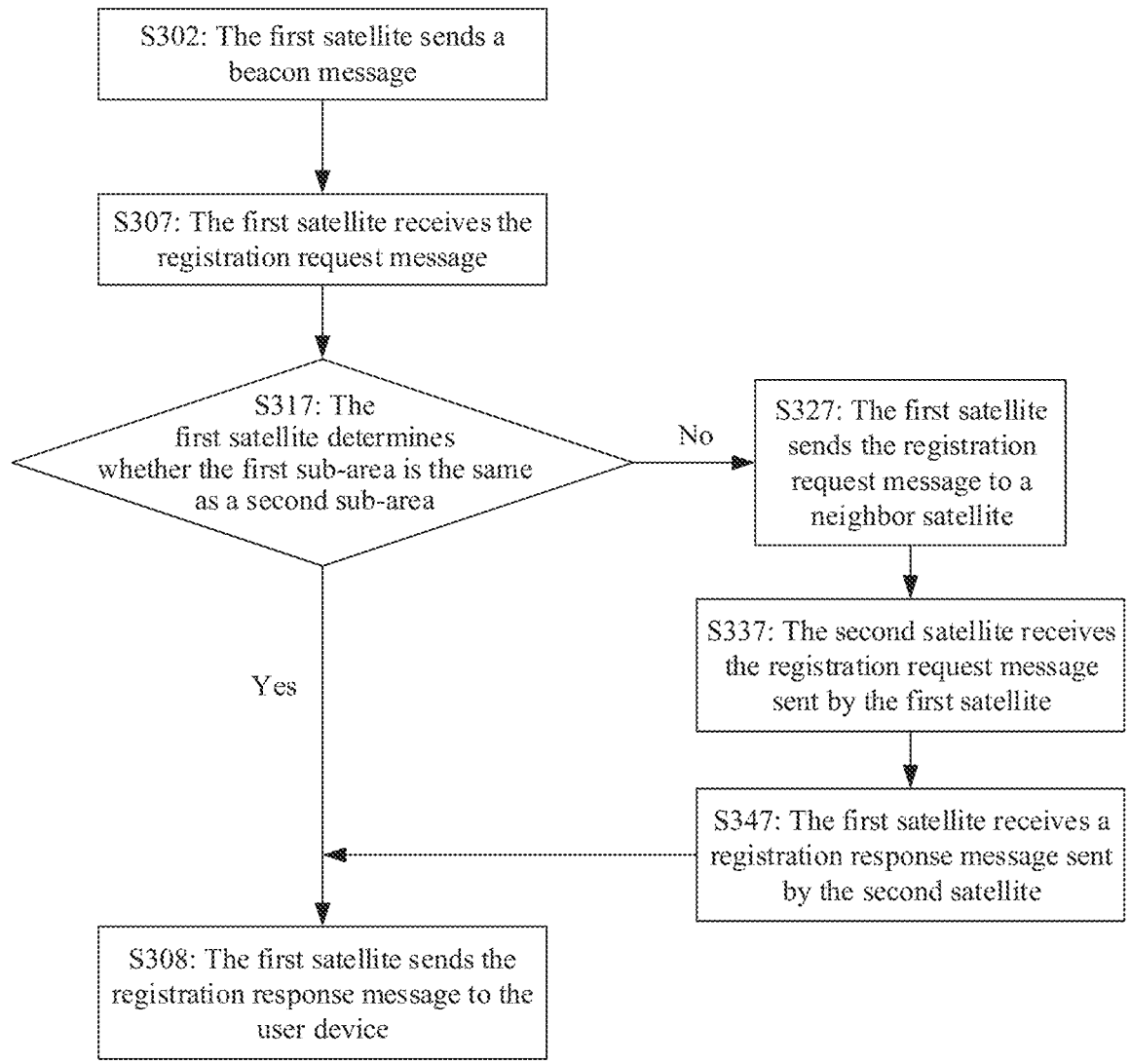
FIG. 7 is a schematic flowchart of a satellite network registration method according to an embodiment of this application.

It should be noted that a sequence between step S305 and step S303 is not strictly limited, provided that S305 is performed before S306. For example, the user device may perform step S305 before steps S303 and S304; or the user device may simultaneously perform steps S303 and S305, and then perform step S304. In addition, step S305 may alternatively be performed at the same time as step S301, or may be performed before step S301. Therefore, an interaction procedure shown in FIG. 7 is merely an example case.

S306: The user device sends a registration request message to the first satellite, where the registration request message includes the user device address information.

Optionally, the user device may determine a registration satellite based on the satellite address information and the user device address information. In one case, if the user device receives only the beacon message sent by the first satellite, and does not receive a beacon message from another satellite, the user device may determine that the first satellite is the registration satellite of the user device, and the user device sends the registration request message to the first satellite. In another case, the user device receives registration request messages sent by a plurality of satellites, including the registration request message sent by the first satellite, the user device determines the registration satellite of the user device based on the satellite address information and the user device address information. The user device determines the registration satellite in a plurality of manners that are to be described in detail in the following embodiment. Herein, it is assumed that the first satellite is the registration satellite of the user device, and the user device sends the registration request message to the first satellite.

S307: The first satellite receives the registration request message.

The first satellite that receives the registration request message extracts the user device address information from the registration request message, and stores the user device address information of the user device. The first satellite determines, based on the user device address information in the registration request message, the EID of the second sub-area in which the user device is currently located and the UDID of the user device. Optionally, the first satellite may establish a registered-user-device table, and store, in the registered-user-device table, an address of the user device that sends the registration request message to the first satellite. Therefore, the first satellite may learn the address information of the user device based on the registration request message. This facilitates addressing and bidirectional communication between the satellite and the user device.

Optionally, after step S307, as shown in FIG. 7, the method further includes S317: Determine whether the first sub-area corresponding to the first satellite is the same as the second sub-area corresponding to the user device, in other words, determine whether the first EID is the same as the second EID.

In a first case, as shown in FIG. 7, if the first sub-area corresponding to the first satellite is different from the second sub-area corresponding to the user device, in other words, the first EID is different from the second EID, the method further includes steps S327, S337, and S347.

S327: The first satellite forwards the registration request message to a neighbor satellite, where the neighbor satellite includes a second satellite, and a sub-area corresponding to an area currently covered by the second satellite is the same as the second sub-area in which the user device is located. Optionally, the neighbor satellite of the first satellite may be one or more satellites, where a sub-area corresponding to an area currently covered by the one or more satellites is adjacent to the sub-area corresponding to the area currently covered by the first satellite. Optionally, the neighbor satellite may be a satellite from which to the first satellite a current distance is less than a specific threshold. For ease of description, the second satellite may be referred to as a serving satellite, where a sub-area corresponding to an area currently covered by the second satellite is the same as the second sub-area in which the user device is located. It may be understood that the second satellite may have another name. This is not limited in this embodiment of this application.

S337: The second satellite (the serving satellite) receives the registration request message forwarded by the first satellite.

Optionally, the second satellite (the serving satellite) further stores the SID of the first satellite in a routing and forwarding table. When receiving the registration request message forwarded by the first satellite, a non-serving satellite ignores the registration request message.

Based on the registration request message, the second satellite (the serving satellite) may also obtain the user device address information of the user device, and may determine that the user device has registered with the first satellite (the registration satellite).

The second satellite sends, to the first satellite, a registration response message used to respond to the registration request message, so that the first satellite forwards the registration response message to the user device, and the user device learns whether the registration succeeds.

S347: The first satellite (the registration satellite) receives the registration response message that is sent by the second satellite (the serving satellite) and that is used to respond to the registration request message.

In a second case, as shown in FIG. 7, if the first sub-area corresponding to the first satellite is the same as the second sub-area corresponding to the user device, in other words, the first EID is the same as the second EID, the first satellite is a serving satellite of the user device and a registration satellite of the user device. In this case, the first satellite does not perform steps S327, S337, and S347, but directly performs step S308.

S308: The first satellite sends a registration response message to the user device, where the registration response message is used to respond to the registration request message.

It should be noted that, in the case in which the first satellite is the serving satellite of the user device and the registration satellite of the user device, the registration response message is generated and sent by the first satellite; and in the case in which the first satellite is only the registration satellite of the user device and the second satellite is the serving satellite of the user device, the registration response message is generated by the second satellite and sent to the first satellite by the second satellite, and then forwarded by the first satellite to the user device.

S309: The user device receives the registration response message.

After receiving the registration response request, the user device can determine whether the registration succeeds.

In this embodiment of this application, the EID of the sub-area is used as a part of a satellite address or a user device address, to indicate a position of the satellite or the user device, so that the satellite or the user device can update the address of the satellite or the user device in real time. In addition, both the satellite and the user device can obtain address information of each other in a registration procedure. In a scenario in which both a satellite and a user device on a satellite network move, addressing may be more complex. If an IP addressing technology is used, the user device and the satellite do not update respective IP addresses in real time with respective movement. The satellite that initially provides a service for the user device may currently move to a relatively far area, but a registration relationship between the satellite and the user device is still maintained. In this case, the satellite cannot normally find the user device through addressing, and the user device cannot normally find the serving satellite through addressing. Consequently, communication efficiency is low, and reliability is reduced. In this application, the EID of the sub-area is used as a part of the satellite address or the user device address, and can be updated in real time during the movement of the satellite or the user device. Therefore, a mobility feature and the like on the satellite network can be adapted, and satellite communication reliability and efficiency can be improved.

Figure 8:
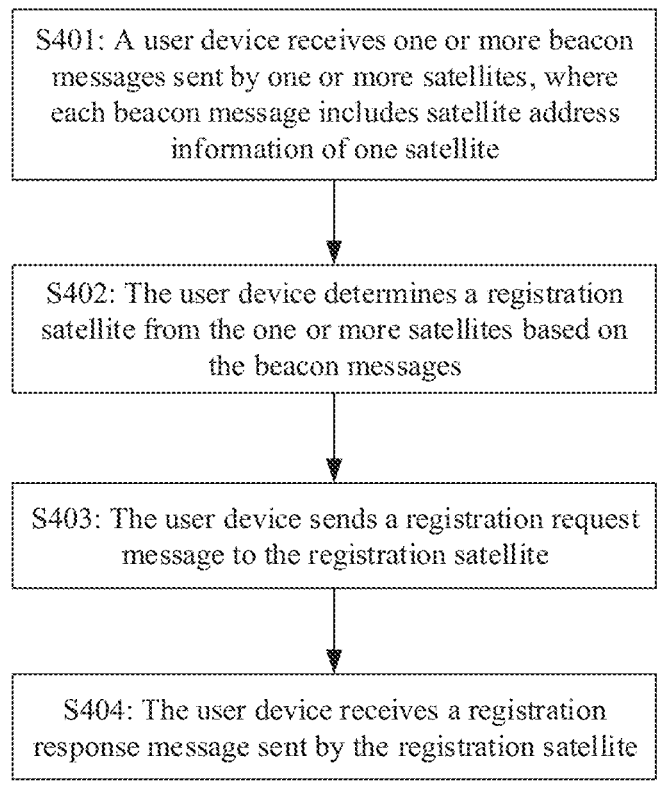
FIG. 8 is a schematic flowchart of another satellite network registration method according to an embodiment of this application.

FIG. 8 is a schematic flowchart of a registration method in a satellite communications system according to an embodiment of this application. The method includes the following steps.

S401: A user device receives one or more beacon messages sent by one or more satellites, where each beacon message includes one piece of satellite address information, the satellite address information includes a sub-area identifier (Earth surface ID, EID) and a satellite device identifier SDID, the sub-area EID is used to indicate a sub-area corresponding to an area currently covered by one of the satellites, and the satellite device identifier SDID is used to indicate a network interface used for communication between the satellite and the user device.

Optionally, the beacon message further includes position information or a height of the satellite, and the position information of the satellite includes a current longitude and a current latitude of the satellite.

In one case, the user device may receive a beacon message sent by one satellite.

In another case, the user device may receive a plurality of beacon messages sent by a plurality of satellites. The plurality of beacon messages one-to-one correspond to the plurality of satellites, and one beacon message includes satellite address information of a satellite that sends the beacon message.

After receiving the beacon message, the user device obtains satellite address information of the one or more satellites from the one or more beacon messages. Optionally, the user device may further obtain position information or height information of the one or more satellites.

Optionally, due to mobility of the satellite, the address information of the satellite changes. If the satellite detects that the sub-area corresponding to the area covered by the satellite changes, the satellite may update the address information, to ensure that the satellite address information carried in the beacon message is current latest address information.

S402: Determine a registration satellite from the one or more satellites based on the one or more beacon messages.

A method for determining a registration satellite includes but is not limited to the following several implementations:

In the case in which the user device receives only a beacon message sent by one satellite, in an example, the user device may use the satellite that sends the beacon message as the registration satellite. In another example, if the EID of the sub-area corresponding to the area covered by the satellite is the same as an EID of a sub-area in which the user device is located, the user device determines the satellite as the registration satellite.

In the case in which the user device receives the beacon messages sent by the plurality of satellites, the user device may determine the registration satellite in the following manners (including but not limited to the following manners).

Manner 1: The registration satellite is determined based on satellite address information carried in a beacon message. The user device determines, from the plurality of satellites, a satellite as the registration satellite, where a sub-area corresponding to an area currently covered by the satellite is the same as the sub-area in which the user device is currently located. Specifically, based on satellite address information carried in the plurality of satellite beacon messages, the user device obtains EIDs of sub-areas corresponding to areas covered by the plurality of satellites at a current moment, and determines, from the plurality of satellites, a satellite that corresponds to, at the current moment, an EID the same as the EID of the sub-area in which the user device is located at the current moment, as the registration satellite.

Manner 2: The registration satellite is determined based on position information and height information of a satellite that are carried in a beacon message. The user device may determine, from the plurality of satellites, a satellite as the registration satellite, where an elevation angle between the satellite and the user device is greater than a first threshold or reaches a maximum value. In an example, the user device calculates an elevation angle between each of the plurality of satellites and the user device based on a longitude, a latitude, and a height that are carried in each of the beacon messages, and selects a satellite as the registration satellite, where an elevation angle between the satellite and the user device is greater than the first threshold or reaches the maximum value. Optionally, the first threshold may be preset, or may be determined by the user device.

Manner 3: The registration satellite is determined based on signal strength of a beacon message. The user device may determine, from the plurality of satellites, a satellite whose beacon message has signal strength greater than a second threshold or has highest signal strength, as the registration satellite. In an example, the user device detects signal strength of the plurality of beacon messages sent by the plurality of satellites, and selects a satellite whose beacon message has signal strength greater than the second threshold or has highest signal strength, as the registration satellite. Optionally, the signal strength may be signal power, a signal-to-noise ratio (SNR), or a received signal level.

It may be understood that Manner 2 and Manner 3 may also be applied to a scenario in which only a beacon message sent by one satellite is received. In Manner 2, only an elevation angle corresponding to the satellite is to be determined. In Manner 3, only signal strength of the beacon message sent by the satellite is to be calculated.

S403: The user device sends a registration request message to the registration satellite.

The registration satellite is determined in Manner 1. To be specific, the user device sends the registration request message to the satellite, where the EID of the sub-area corresponding to the area covered by the satellite is the same as the EID of the sub-area in which the user device is located.

The registration satellite is determined in Manner 2. To be specific, the user device sends the registration request message to the satellite, where the elevation angle between the satellite and the user device reaches the maximum value or is greater than the first threshold.

The registration satellite is determined in Manner 3. To be specific, the user device sends the registration request message to the satellite corresponding to the beacon message with highest signal strength.

S404: The user device receives a registration response message sent by the registration satellite.

The user device may determine, based on the registration response message, whether the registration succeeds.

Figure 9:
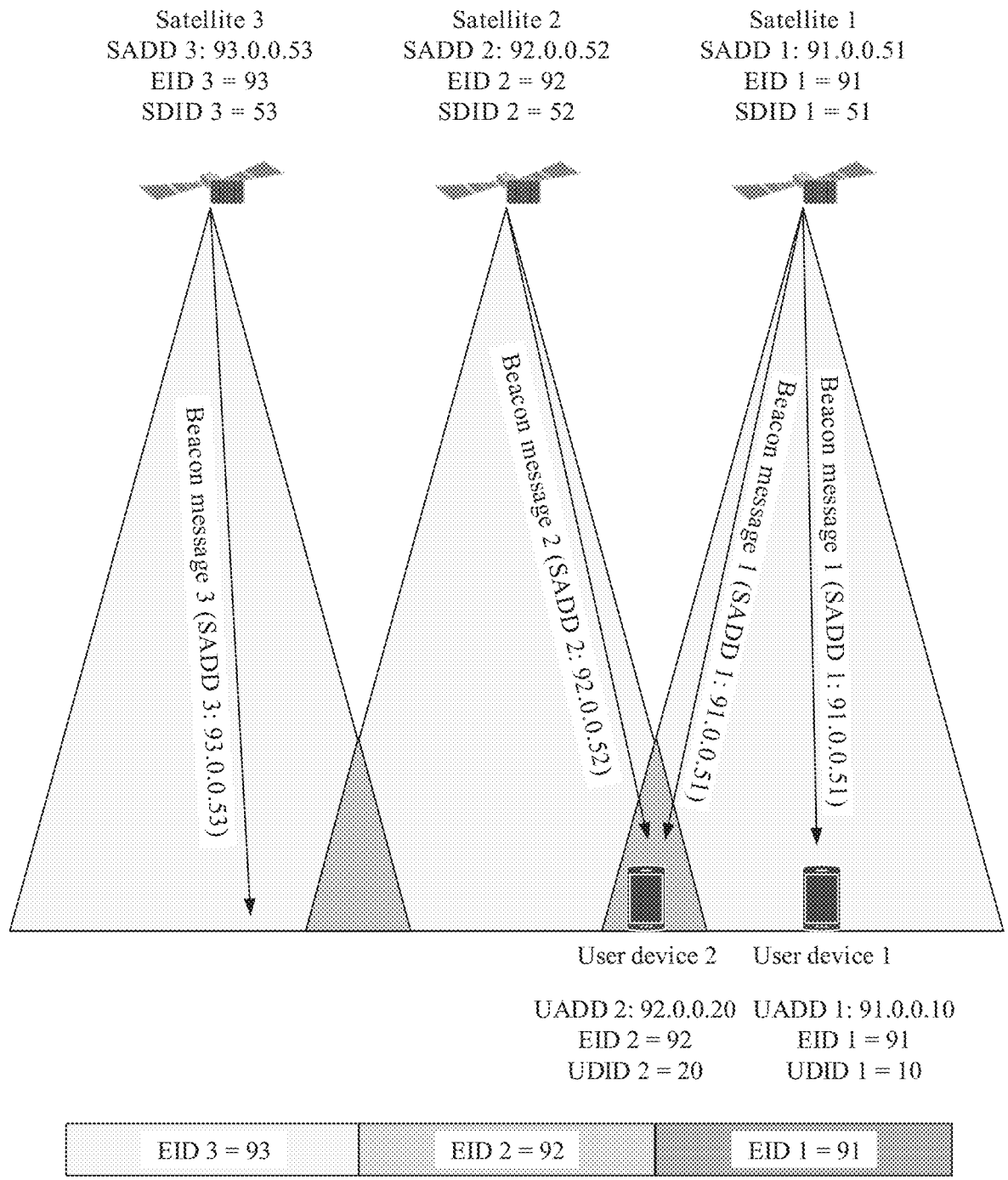
FIG. 9 shows an example of a satellite network registration method according to an embodiment of this application.

For example, FIG. 9 shows an example of a registration method according to an embodiment of this application. A satellite 1, a satellite 2, and a satellite 3 are three satellites in an orbit 5 shown in FIG. 1. Subareas currently corresponding to the satellites are as follows: An EID 1 corresponding to the satellite 1 is equal to 91, an EID 2 corresponding to the satellite 2 is equal to 92, and an EID 3 corresponding to the satellite 3 is equal to 93. Satellite device identifiers SDIDs of the satellites are as follows: An SDID 1 of the satellite 1 is equal to 51, an SDID 2 of the satellite 2 is equal to 52, and an SDID 3 of the satellite 3 is equal to 53. A SADD of the satellite 1 may be represented as 91.0.0.51, and a SADD of the satellite 2 may be represented as 92.0.0.52. An EID 1 of a user device 1 is equal to 91, and an EID 2 of a user device 2 is equal to 92. If a UDID 1 of the user device 1 is equal to 10, and a UDID 2 of the user device 2 is equal to 20, a user device address of the user device 1 may be represented as a UADD 1 (91.0.0.10), and a user device address of the user device 2 may be represented as a UADD 2 (92.0.0.20).

The user device 1 receives only a beacon message 1 sent by the satellite 1, and the beacon message 1 includes the SADD 1 of the satellite 1. If the user device 1 extracts, from the SADD 1 in the beacon message 1, the EID of the sub-area corresponding to the satellite 1, and determines that the EID 1 of the sub-area corresponding to the satellite 1 is equal to the EID 1 of the sub-area in which the user device 1 is located, the user device 1 may determine that the satellite 1 is a registration satellite of the user device 1. Further, the user device 1 may send a registration request message to the satellite 1, where the registration request message carries the UADD 1 of the user device 1. After receiving the registration request message, the satellite 1 sends a registration response message to the user device 1.

The user device 2 receives both the beacon message 1 sent by the satellite 1 and a beacon message 2 sent by the satellite 2. The beacon message 1 includes the SADD 1 of the satellite 1, and the beacon message 2 includes the SADD 2 of the satellite 2. The user device 2 extracts, from the SADD 1 in the beacon message 1, the EID of the sub-area corresponding to the satellite 1, and extracts, from the SADD of the beacon message 2, the EID of the sub-area corresponding to the satellite 2. Optionally, the beacon message 1 may further include height information and longitude and latitude information of the satellite 1, and the beacon message 2 may further include height information and longitude and latitude information of the satellite 2.

For example, the user device 2 determines a registration satellite in Manner 1. If the user device 2 determines that the EID 2 of the sub-area corresponding to the satellite 2 is equal to the EID 2 of the sub-area in which the user device 2 is located, the user device 2 may determine that the satellite 2 is the registration satellite of the user device 2. Further, the user device 2 may send a registration request message to the satellite 2, where the registration request message carries the UADD 1 of the user device 1. After receiving the registration request message, the satellite 2 sends a registration response message to the user device 2.

For example, the user device 2 determines a registration satellite in Manner 2. The user device 2 calculates an elevation angle 1 between the user device 2 and the satellite 1 and an elevation angle 2 between the user device 2 and the satellite 2. In an example, if the user device 2 determines that the elevation angle 2 is greater than the elevation angle 1, the user device 2 may determine that the satellite 2 is the registration satellite of the user device 2. Further, the user device 2 may send a registration request message to the satellite 2, where the registration request message carries the UADD 1 of the user device 1. After receiving the registration request message, the satellite 2 sends a registration response message to the user device 2.

For example, the user device 2 determines a registration satellite in Manner 3. The user device 2 detects signal strength 1 of the beacon message 1 and signal strength 2 of the beacon message 2. In an example, if the user device 2 determines that the signal strength 2 is higher than the signal strength 1, the user device 2 may determine that the satellite 2 is the registration satellite of the user device 2. Further, the user device 2 may send a registration request message to the satellite 2, where the registration request message carries the UADD 1 of the user device 1. After receiving the registration request message, the satellite 2 sends a registration response message to the user device 2.

As the user device moves or the satellite moves, the sub-area in which the user device is located may change. If the user device detects that the sub-area in which the user device is located changes, the user device updates user device address information of the user device. Further, the user device may alternatively actively start a registration procedure. To be specific, the user device actively sends a registration request message, where the registration request message carries updated user device address information. A satellite that receives the registration request message performs a processing procedure similar to steps S307, S317, and S308 or similar to steps S307. S317. S327. S337, or S347. Details are not described herein again.

In this embodiment of this application, the sub-area is used as a part of a satellite address or a user device address, to indicate a position of the satellite or the user device, so that the satellite or the user device can update the address of the satellite or the user device in real time. In addition, both the satellite and the user device can obtain address information of each other in the registration procedure in real time. In a scenario in which both a satellite and a user device on a satellite network move, addressing may be more complex. If an IP addressing technology is used, the user device and the satellite do not update respective IP addresses in real time with respective movement. The satellite that initially provides a service for the user device may currently move to a relatively far area, but a registration relationship between the satellite and the user device is still maintained. In this case, the satellite cannot normally find the user device through addressing, and the user device cannot normally find the serving satellite through addressing. In this application, the sub-area is used as a part of the satellite address or the user device address, and the address information can be updated in real time during the movement of the satellite or the user device. Therefore, features such as mobility and a dynamic topology on the satellite network can be adapted, and satellite communication reliability and efficiency can be improved.

Figure 10:
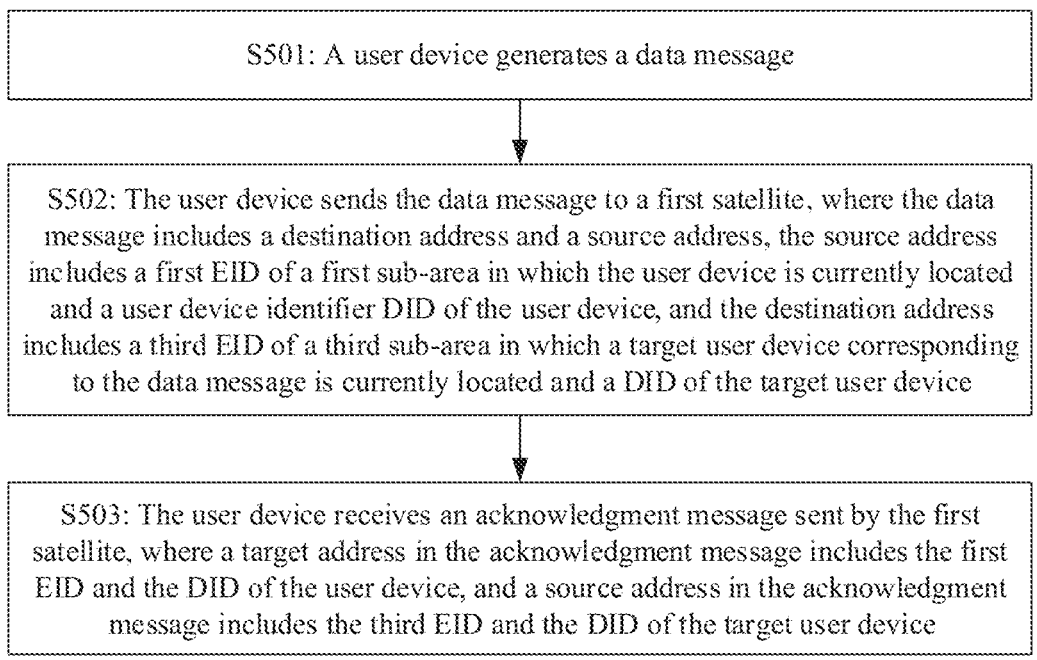
FIG. 10 is a schematic flowchart of a satellite network data communication method according to an embodiment of this application.

The foregoing embodiment provides the schematic flowchart of the registration method in the satellite communications system. Based on the foregoing naming and addressing methods, an embodiment of this application provides a schematic flowchart of a data communication method in a satellite communications system. As shown in FIG. 10, the method includes the following steps.

S501: A user device generates a data message.

S502: The user device sends the data message to a first satellite, where the data message includes a destination address and a source address, the source address includes a first EID of a first sub-area in which the user device is currently located and a user device identifier UDID of the user device, and the destination address includes a third EID of a third sub-area in which a target user device corresponding to the data message is located at a current moment and a UDID of the target user device.

The source address is user device address information of the user device, and the destination address is user device address information of the target user device. A method for determining the source address is similar to the method for determining the user device address information by the user device in the foregoing embodiment. For details, refer to step S201 or step S305. Details are not described herein again.

Optionally, the method further includes S503: The user device receives an acknowledgement message sent by the first satellite, where a destination address in the acknowledgement message includes the first EID and the UDID of the user device, and a source address in the acknowledgement message includes the third EID and the UDID of the target user device.

The user device that receives the acknowledgement message may determine whether the target receiving user device successfully receives the data message sent by the user device.

In this embodiment of this application, the sub-area is used as a part of a satellite address or a user device address, to indicate a position of the satellite or the user device, so that the satellite or the user device can update the address of the satellite or the user device in real time. In a scenario in which both a satellite and a user device on a satellite network move, addressing may be more complex. If an IP addressing technology is used, the user device and the satellite do not update respective IP addresses in real time with respective movement. The satellite that initially provides a service for the user device may currently move to a relatively far area, but a registration relationship between the satellite and the user device is still maintained. In this case, the satellite cannot normally find the user device through addressing, and the user device cannot normally find the serving satellite through addressing. Consequently, normal or efficient bidirectional communication cannot be implemented. In this embodiment of this application, the sub-area is used as a part of the satellite address or the user device address, and the address information can be updated in real time during the movement of the satellite or the user device. Therefore, features such as mobility and a dynamic topology on the satellite network can be adapted, and satellite communication reliability and efficiency can be improved.

Figure 11:
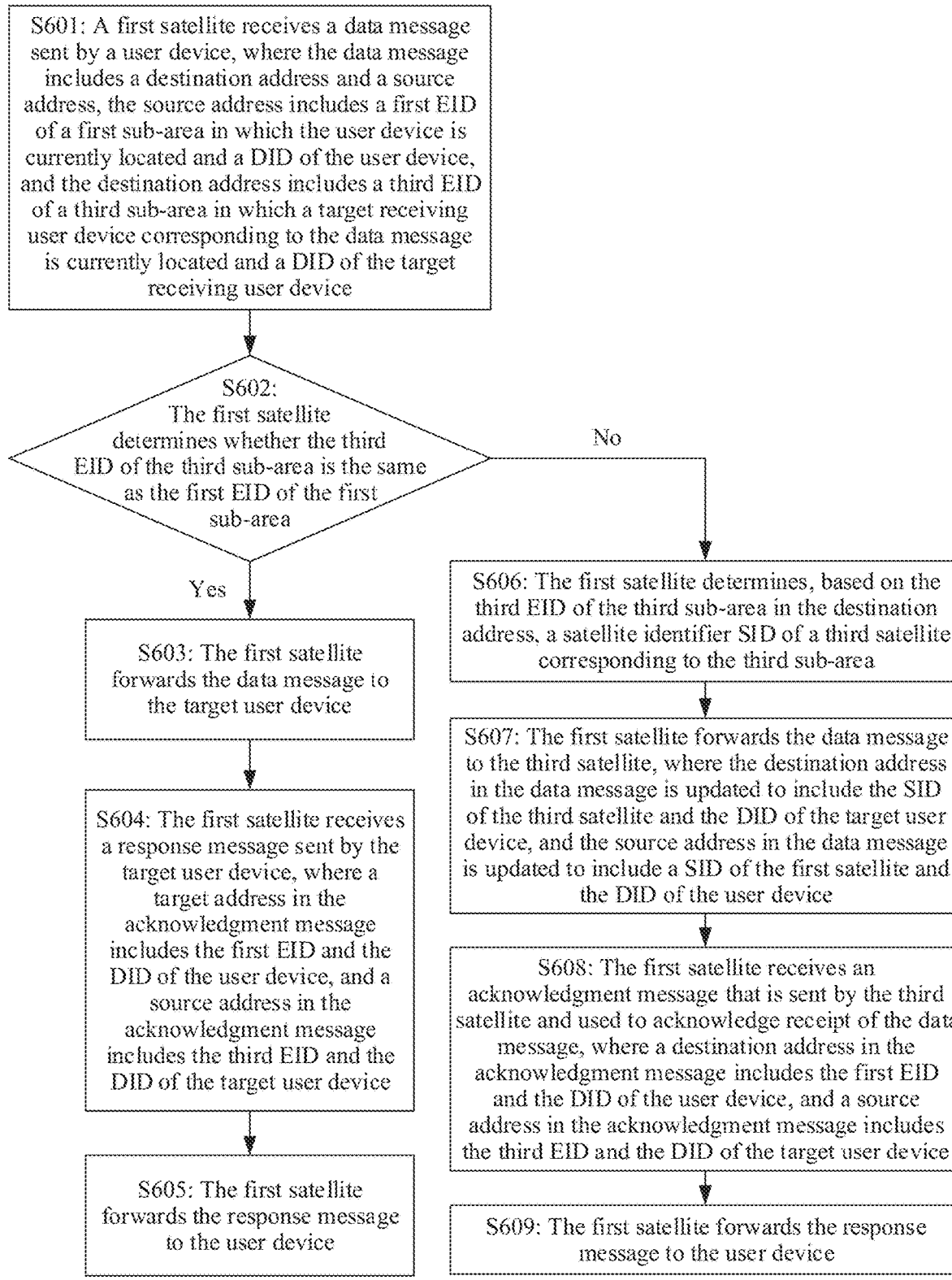
FIG. 11 is a schematic flowchart of another satellite network data communication method according to an embodiment of this application.

An embodiment provides a schematic flowchart of another data communication method in a satellite communications system. As shown in FIG. 11, the method includes the following steps.

S601: A first satellite receives a data message sent by a user device, where the data message includes a destination address and a source address, the source address includes a first EID of a first sub-area in which the user device is currently located and a UDID of the user device, and the destination address includes a third EID of a third sub-area in which a target user device corresponding to the data message is currently located and a UDID of the target user device.

After receiving the data message sent by the user device, the first satellite may obtain the destination address and the source address from the data message. The destination address is user device address information of the target user device, and the source address is user device address information of the user device. The first satellite extracts, from a destination address of the user device, the third EID of the third sub-area in which the target user device is currently located and the UDID of the target user device.

Optionally, a sub-area corresponding to an area currently covered by the first satellite is the first sub-area. In other words, the first satellite may be a serving satellite of the user device.

S602: The first satellite determines whether the third EID of the third sub-area is the same as the first EID of the first sub-area.

The first satellite can determine, by determining whether the first EID of the sub-area corresponding to the area currently covered by the satellite is equal to the EID of the third sub-area, whether the sub-area in which the target user device is located is the same as the sub-area in which the user device is located.

If the third EID is the same as the first EID, in other words, if the user device and the target user device are currently located in a same sub-area, the first satellite performs step S603. Optionally, the first satellite may further perform S604 and S605.

S603: The first satellite forwards the data message to the target user device.

The target user device that receives the data message may further feed back a response message to the first satellite, to notify the user device whether the target user device successfully receives the data message.

Therefore, optionally, the method further includes S604: The first satellite receives the response message sent by the target user device, where a destination address in the acknowledgement message includes the first EID and the UDID of the user device, and a source address in the acknowledgement message includes the third EID and the UDID of the target user device.

S605: The first satellite forwards the response message to the user device.

The user device that receives the response message may determine whether the target user device successfully receives the data message.

If the third EID is different from the first EID, in other words, if the user device and the target receiving user device are not located in a same sub-area currently, but are located in different sub-areas, the first satellite performs step S606. Optionally, the first satellite may further perform S608 and S609.

S606: The first satellite determines, based on the third EID of the third sub-area in the destination address, a satellite identifier SID of a third satellite corresponding to the third sub-area, where the SID of the third satellite is used to indicate the third satellite, and a sub-area corresponding to an area currently covered by the third satellite is the third sub-area.

The first sub-area and the third sub-area each are one of sub-areas divided from the earth surface. During earth surface sub-area division and earth surface sub-area EID encoding, a quantity of orbits and a quantity of satellites in each orbit need to be considered. For a specific division method, refer to Manner 2 in step S101. For a method for addressing the sub-areas obtained through division, refer to descriptions in Example 1 and Example 2 in step S101. For a specific sub-area division and numbering example, refer to FIG. 2.

Determining the satellite identifier SID of the third satellite corresponding to the third sub-area includes: determining the satellite identifier SID of the third satellite based on a mapping relationship between the SID of the third satellite and EIDs of a plurality of sub-areas.

In Example 1, EIDs of N sub-areas corresponding to one orbit are consecutive integers, and the mapping relationship between the SID of the third satellite and the EIDs of the plurality of sub-areas is as follows:

$$EID_t = \left\{ \text{int}(SID/N) * N + \left[ SID + \text{int}\left(t * \frac{N}{T}\right) \text{mod} N \right] \text{mod} N \right\} \quad \text{Formula (6)}$$

where $EID_t$ represents the third EID of the third sub-area corresponding to the area covered by the third satellite at a current moment, SID of the third satellite is equal to an identifier $EID_0$ of a sub-area corresponding to an area covered by the third satellite at an initial moment, N represents a quantity of satellites in an orbit in which the third satellite is located, T represents a revolution period of the satellite in the orbit, int represents a rounding operation, and mod represents a modulo operation.

An EID shown in FIG. 2 is used as an example. It is assumed that there are 18 satellites in an orbit 0, the satellites move from a sub-area with a small EID to a sub-area with a large EID, EIDs of sub-areas corresponding to the satellites at a current moment t(t=T/N) are successively 0, 1, 2, 3, ..., and 18, and an EID of the sub-area corresponding to the area covered by the third satellite at the current moment is 2. In this case, it may be determined, according to Formula (1), that $EID_0$ corresponding to the area covered by the third satellite at the initial moment is 1, and the SID corresponding to the third satellite is equal to $EID_0$ at the initial moment, that is, SID=1.

In Example 2, EIDs of sub-areas corresponding to one orbit constitute an arithmetic sequence whose common difference d is an integer greater than 1, and the mapping relationship between the SID of the satellite and the EIDs of the plurality of sub-areas is as follows:

$$EID_t = \left\{ \text{int}(SID/N/d) * N * d + \left[ SID + d * \left( \text{int}\left(t * \frac{N}{T}\right) \text{mod} N \right) \right] \text{mod}(N * d) \right\} \quad \text{Formula (7)}$$

where $EID_t$ represents the third sub-area identifier EID of the third sub-area corresponding to the area covered by the third satellite at a current moment. SID of the third satellite is equal to an identifier $EID_0$ of a sub-area corresponding to an area covered by the third satellite at an initial moment, N represents a quantity of satellites in an orbit in which the third satellite is located, T represents a revolution period of the satellite in the orbit, int represents a rounding operation, and mod represents a modulo operation.

According to the foregoing method, a satellite can determine a SID of the satellite based on a one-to-one mapping between a SID and an EID and based on an EID of a sub-area corresponding to an area currently covered by the satellite, but does not need to store a mapping relationship between a SID addressing table and an EID addressing table or a mapping relationship table in another form. Therefore, a memory space of the satellite can be greatly saved. In addition, the EID is determined through calculation in real time. A calculation delay of the satellite is far smaller than a table lookup delay of the satellite. Especially when there are a very large quantity of satellites, the delay can be greatly reduced, and operating efficiency of a system can be greatly improved.

S607: The first satellite forwards the data message to the third satellite, where the destination address in the data message is updated to include the SID of the third satellite and the UDID of the target user device, and the source address in the data message is updated to include the SID of the first satellite and the UDID of the user device.

After obtaining the SID of the third satellite, the first satellite may update the destination address and the source address in the data message. The destination address is updated to include the SID of the third satellite and the UDID of the target user device, and the source address is updated to include the SID of the first satellite and the UDID of the user device.

An updated destination address and an updated source address do not include an EID of a subarea. In this way, the data message or another message does not depend on the sub-area when being routed and forwarded between satellites, so that a mobility problem of the satellite is separate from a routing problem of the satellite. In addition, a conventional routing algorithm can be reused, the SID is directly used as a route index for routing and forwarding on an ISL/IOL link, and a new inter-satellite routing algorithm does not need to be designed. Therefore, compatibility is good.

As satellites move at a high speed, EIDs corresponding to the satellites change, but an inter-satellite link is relatively stable. Therefore, the addresses that do not include an EID are used for inter-satellite routing, a mobility problem of the satellites is separate from a routing problem of the satellites, and routing efficiency can be improved. In this application, the SID is used as an index number for inter-satellite routing. This can avoid frequent updating a routing table by a satellite, reduce routing complexity and a routing delay, and reduce occupied system resources. In addition, the conventional routing algorithm can be used to perform inter-satellite routing. Therefore, compatibility is good. The satellite updates address information in real time. In this way, a satellite network can correctly find a current serving satellite of the user device through addressing, and satellite network communication efficiency can be improved.

After the third satellite receives the data message, there are at least two cases:

Case 1: The third satellite is a registration satellite of the target user device.

The third satellite may determine, by looking up a registered-user information table, whether the target user device is a registered user that has registered with the third satellite, and if the target user device is a registered user, the third satellite forwards the data message to the target user device. Optionally, in the data message forwarded by the third satellite, a destination address includes the EID of the sub-area in which the target user device is located and the UDID of the target user device, and a source address includes the EID of the sub-area in which the user device is located and the UDID of the user device. Optionally, after receiving the data message, the user device may further feed back an acknowledgement message to the third satellite.

Case 2: The third satellite is not a registration satellite of the target user device. The third satellite may determine, by looking up a registered-user information table, whether the target user device is a registered user that has registered with the third satellite. If the target user device is not a registered user, the third satellite may further look up a registration satellite information table, to find a registration satellite of the target user device, and forward the data message to the registration satellite; and then the registration satellite forwards the data message to the target user device. Optionally, the method further includes: feeding back, by the user device, an acknowledgement message to the registration satellite; forwarding, by the registration satellite, the acknowledgement message to the third satellite; and forwarding, by the third satellite, the acknowledgement message to the first satellite. The registered-user information table includes user device address information of a user device that has registered with the third satellite.

Optionally, S608: The first satellite receives an acknowledgement message that is sent by the third satellite and used to acknowledge receipt of the data message, where a destination address in the acknowledgement message includes the first EID and the UDID of the user device, and a source address in the acknowledgement message includes the third EID and the UDID of the target user device.

Optionally, S609: The first satellite forwards the response message to the user device.

According to the satellite network communication method provided in this embodiment of this application, the sub-area is used as a part of a satellite address or a user device address, to indicate a position of the satellite or a position of the user device, so that the satellite or the user device can update the address of the satellite or the user device in real time. In a scenario in which both a satellite and a user device on a satellite network move, addressing may be more complex. If an IP addressing technology is used, the user device and the satellite do not update respective IP addresses in real time with respective movement. The satellite that initially provides a service for the user device may currently move to a relatively far area, but a registration relationship between the serving satellite and the user device is still maintained. In this case, the satellite cannot normally find the user device through addressing, and the user device cannot normally find the serving satellite through addressing. Consequently, normal or efficient bidirectional communication cannot be implemented. In this embodiment of this application, the sub-area is used as a part of the satellite address or the user device address. The satellite and the user device can quickly find the serving satellite of the user device through addressing based on the address information of the user device and the address information of the satellite. This improves communication efficiency, and reduces a communication delay, and can adapt to features such as mobility and a dynamic topology on the satellite network.

Figure 12:
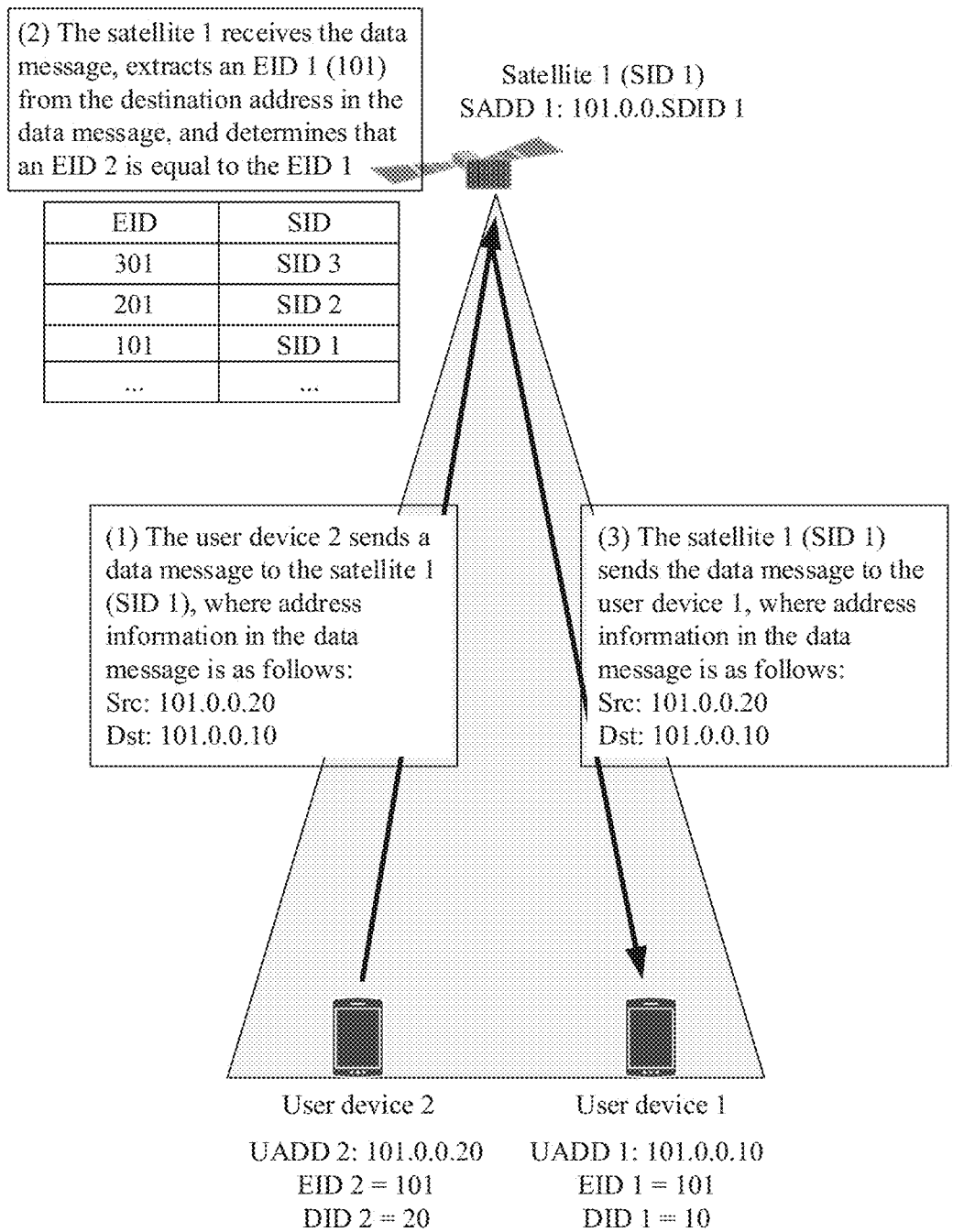
FIG. 12 shows an example of a satellite network data communication procedure according to an embodiment of this application.

FIG. 12 shows a specific example of a satellite network data communication procedure. As shown in FIG. 12, a user device 2 needs to communicate with a user device 1 through a satellite network. A UADD 2 of the user device 2 is 101.0.0.20, an EID 2 of a sub-area in which the user device 2 is currently located is equal to 101, and a user device identifier UDID 2 of the user device 2 is equal to 20. A UADD 1 of the user device 1 is equal to 101.0.0.10, an EID 1 of a sub-area in which the user device 1 is currently located is equal to 101, and a user device identifier UDID 1 of the user device 1 is equal to 10.

The user device 2 may send a data message to a satellite 1 through a USL/GSL, where a source address (Src) in the data message is 101.0.0.20, and a destination address (Dst) in the data message is 101.0.0.10. The satellite 1 that receives the data message obtains the EID 1 from the data message, and the satellite 1 determines that the EID 2 is equal to the EID 1. Further, the satellite 1 may send the data message to the user device 1 through the USL/GSL, so that the user device 1 receives the data message. The user device 1 may feed back an acknowledgement message to the user device 2 in a similar procedure. Specifically, the user device 1 sends the acknowledgement message to the satellite 1, where a destination address in the acknowledgement message is 101.0.0.20, a source address in the acknowledgement message is 101.0.0.10. The satellite 1 that receives the acknowledgement message determines that the EID 2 is equal to the EID 1, and sends the acknowledgement message to the user device 2. The user device 2 may determine, based on the acknowledgement message, whether the user device 1 successfully receives the data message.

Figure 13A:
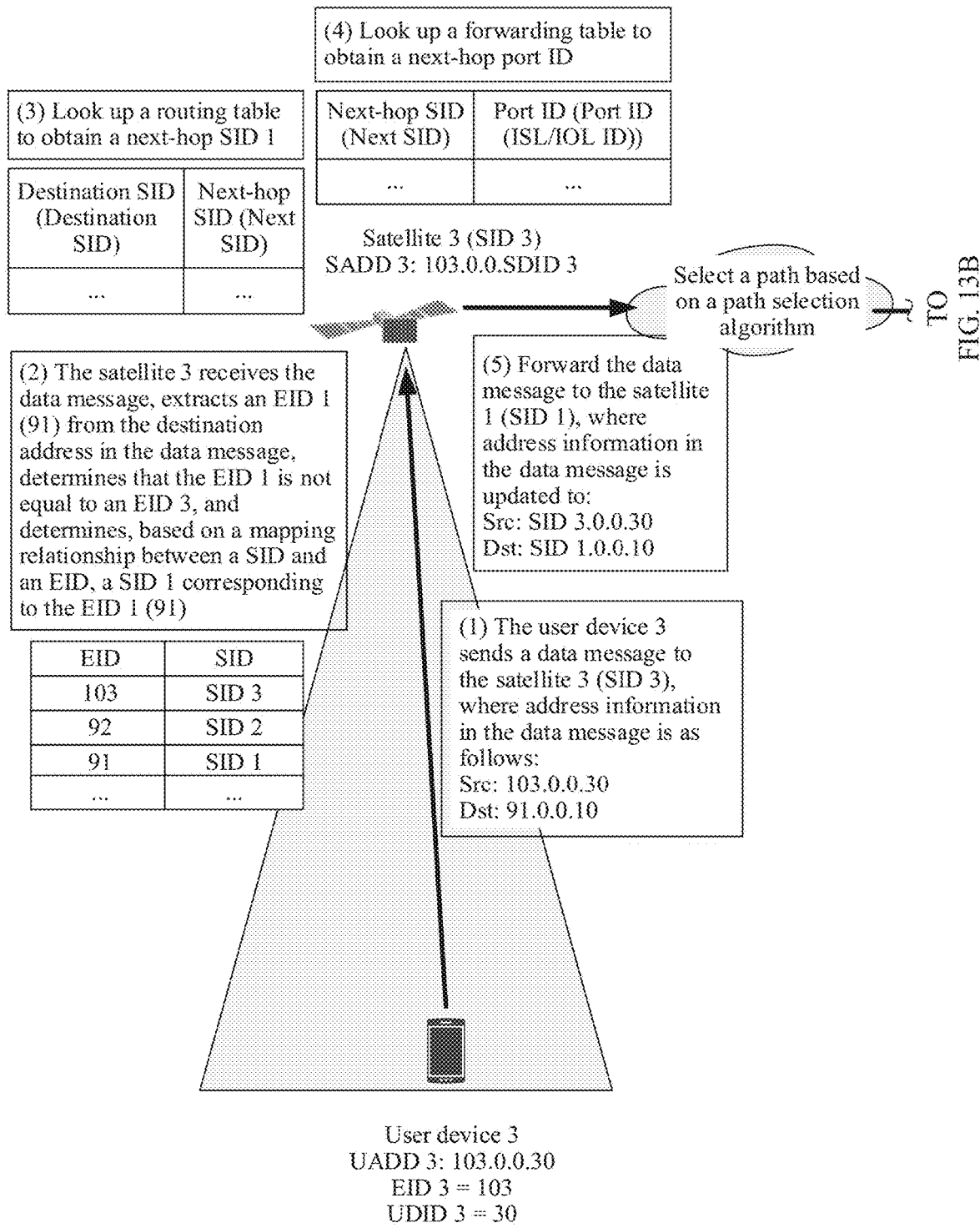
FIG. 13A and FIG. 13B show an example of a satellite network data communication procedure according to an embodiment of this application.
Figure 13B:
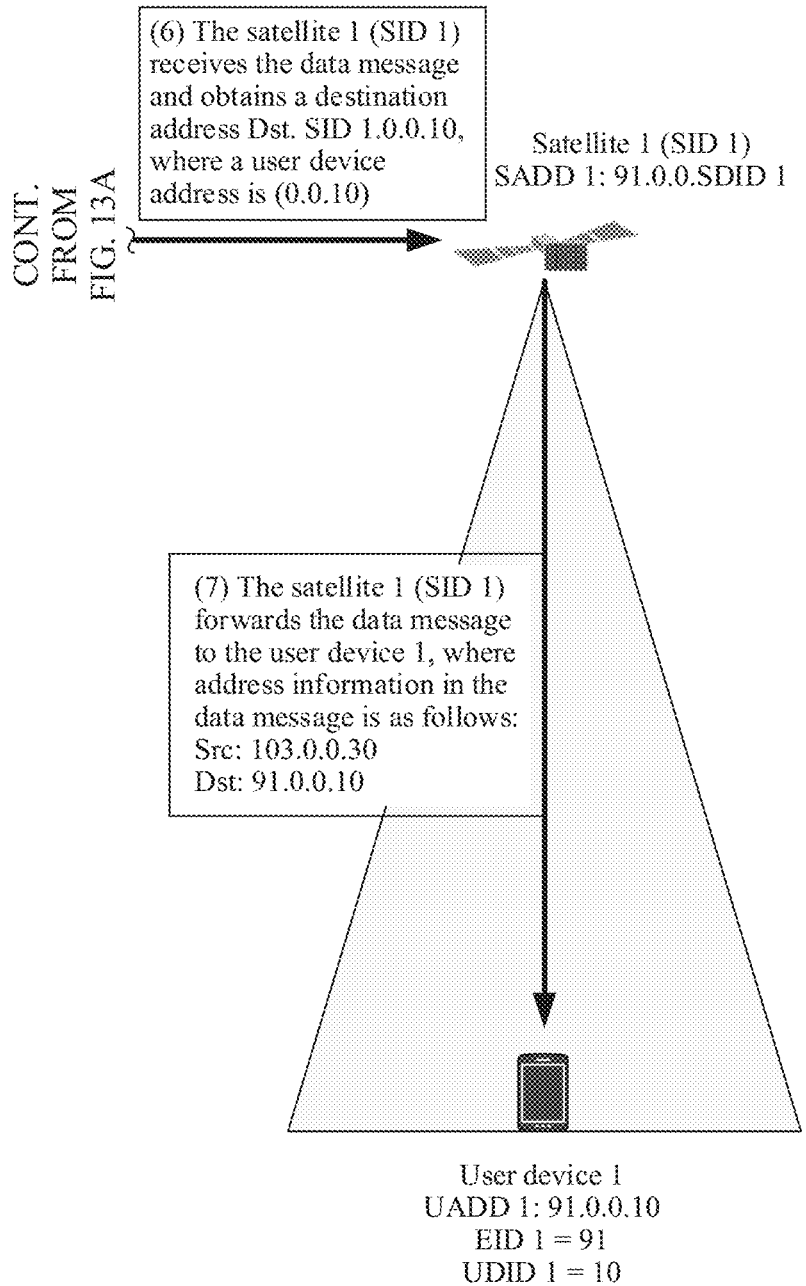

FIG. 13A and FIG. 13B show a specific example of another satellite network data communication procedure. As shown in FIG. 13A and FIG. 13B, a user device 3 needs to communicate with a user device 1 through a satellite network. A UADD 3 of the user device 3 is 103.0.0.30, an EID 3 of a sub-area in which the user device 3 is currently located is equal to 103, and a UDID 3 of the user device 3 is equal to 30. A UADD 1 of the user device 1 is equal to 91.0.0.10, an EID 1 of a sub-area in which the user device 1 is currently located is equal to 91, and a UDID 1 of the user device 1 is equal to 10. It is assumed that a satellite 1 is a serving satellite and a registration satellite of the user device 1.

The user device 3 may send a data message to a satellite 3 through a USL/GSL, where a source address (Src) in the data message is 103.0.0.30 and a destination address (Dst) in the data message is 91.0.0.10. The satellite 3 that receives the data message obtains the EID 1 from the data message, and determines that the EID 3 is not equal to the EID 1. The satellite 3 determines, based on a mapping relationship between a SID and an EID (for example, Formula (6) or Formula (7)), a SID 1 corresponding to the EID 1. Further, the satellite 3 may obtain a next-hop SID and a next-hop port ID by looking up a routing table, where the port ID may be an ISL/IOL link D. The satellite 3 sends the data message, where the destination address in the data message is updated to SID1.0.0.10, and the source address is updated to SID3.0.0.30. The data message may pass through a path selected based on a path selection algorithm on the satellite network, and then may be received by the satellite 1 through an ISL/IOL link. If the satellite 1 determines that a user device corresponding to the destination address in the data message is the user device 1 served by the satellite 1, the satellite 1 sends the data message to the user device 1, where the destination address in the data message is further updated to 91.0.0.10, and the source address in the data message is updated to 103.0.0.30. In this way, the user device 1 receives the data message. The user device 1 may feed back an acknowledgement message to the user device 3 in a similar procedure. Specifically, the user device 1 sends the acknowledgement message to the satellite 1, where a destination address in the acknowledgement message is 103.0.0.30, and a source address in the acknowledgement message is 91.0.0.10. The satellite 1 that receives the acknowledgement message forwards the acknowledgement message to the satellite 3, and the satellite 3 further forwards the acknowledgement message to the user device 3.

Figure 14A:
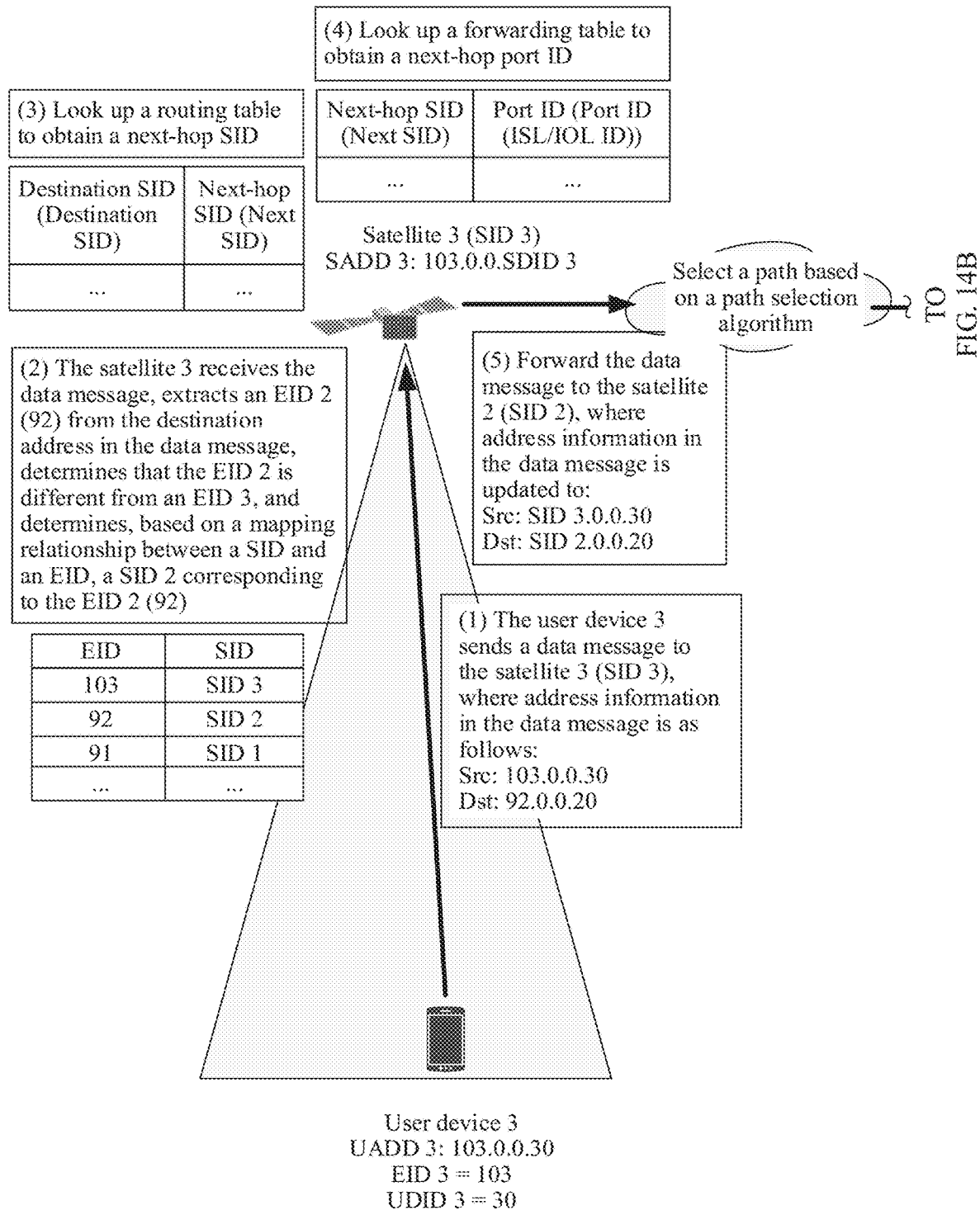
FIG. 14A and FIG. 14B show an example of a satellite network data communication procedure according to an embodiment of this application.
Figure 14B:
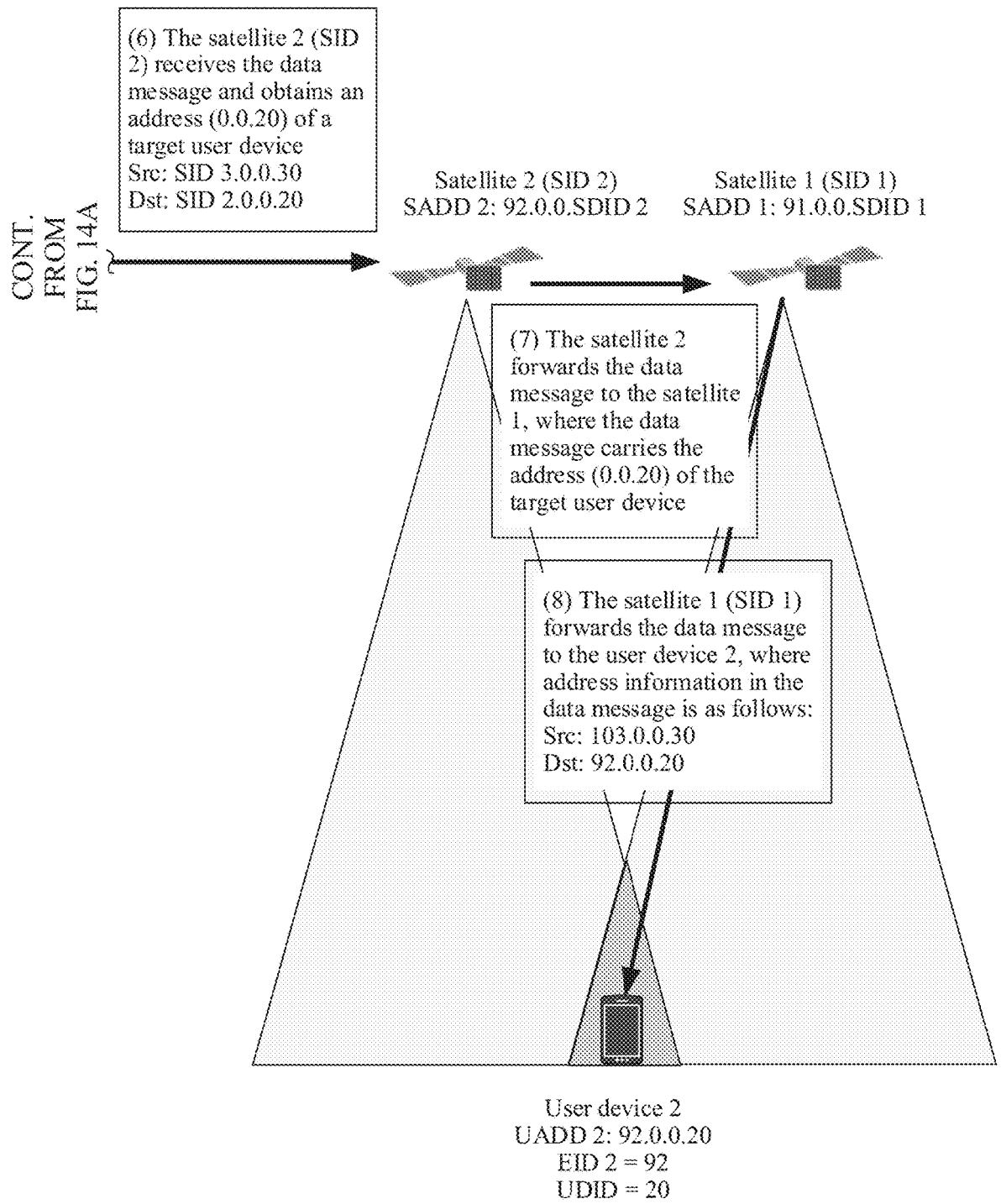

FIG. 14A and FIG. 14B show a specific example of still another satellite network data communication procedure. As shown in FIG. 14A and FIG. 14B, a user device 3 needs to communicate with a user device 2 through a satellite network. A UADD 3 of the user device 3 is 103.0.0.30, an EID 3 of a sub-area in which the user device 3 is currently located is equal to 103, and a UDID 3 of the user device 3 is equal to 30. A UADD 2 of the user device 2 is equal to 92.0.0.20, an EID 2 of a sub-area in which the user device 2 is currently located is equal to 92, and a UDID 2 of the user device 2 is equal to 92. It is assumed that a satellite 1 is a registration satellite of the user device 2, and a satellite 2 is a serving satellite of the user device 2.

The user device 3 may send a data message to a satellite 3 through a USL/GSL, where a source address (Src) in the data message is 103.0.0.30, and a destination address (Dst) in the data message is 92.0.0.20. The satellite 3 that receives the data message obtains the EID 2 from the data message, and determines that the EID 3 is not equal to the EID 2. The satellite 3 determines, based on a mapping relationship between a SID and an EID (for example, Formula (6) or Formula (7)), a SID 2 corresponding to the EID 2. The satellite 3 may obtain a next-hop SID and a next-hop port ID by looking up a routing table, where the port ID may be an ISL/IOL link D. The satellite 3 sends the data message, where the destination address in the data message is updated to SID2.0.0.20, and the source address in the data message is updated to SID3.0.0.30. The data message may pass through a path selected based on a path selection algorithm on the satellite network, and then may be received by the satellite 2. The satellite 2 extracts the UDID 2 of the user device 2 from the destination address, and determines that the satellite 2 is not the registration satellite of the user device 2. Then, the satellite 2 looks up a registration satellite information table, and determines that the registration satellite of the user device 2 is the satellite 1, and the satellite 2 forwards the data message to the registration satellite 1. After receiving the data message, the satellite 1 may send the data message to the user device 2 through a USL/GSL, where the destination address in the data message is further updated to 92.0.0.20, and the source address in the data message is updated to 103.0.0.30. In this way, the user device 2 receives the data message. The user device 2 may feed back an acknowledgement message to the user device 3 in a similar procedure. Specifically, the user device 2 sends the acknowledgement message to the satellite 1, where a destination address in the acknowledgement message is 103.0.0.30 and a source address in the acknowledgement message is 92.0.0.20. The satellite 1 that receives the acknowledgement message forwards the acknowledgement message to the satellite 2. Then, the satellite 2 forwards the acknowledgement message to the satellite 3, and the satellite 3 further forwards the acknowledgement message to the user device 3.

Figure 15:
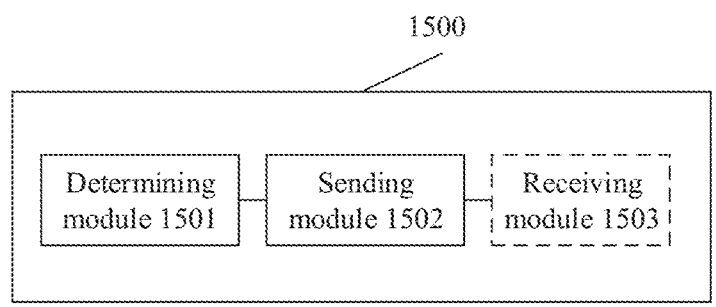
FIG. 15 shows a communications apparatus on a user device side according to an embodiment of this application.

An embodiment of this application provides a communications apparatus 1500. The communications apparatus may be applied to a user device side, and may be configured to implement the methods and the steps related to the user device in the foregoing embodiments. The user device may be a communications apparatus located in the ground segment shown in FIG. 1, for example, a user terminal, a satellite UE, a cellular UE, a ground station, a cellular base station, or an access point. The communications apparatus may be a user device, or may be a chip in a user device. As shown in FIG. 15, the communications apparatus 1500 includes a determining module 1501 and a sending module 1502.

The determining module 1501 may be configured to determine user device address information of a user device, where the user device address information includes a second sub-area identifier EID and a user device identifier UDID of the user device, and the second EID is used to indicate a second sub-area in which the user device is currently located. In a possible implementation, the determining module 1501 is further configured to determine, based on satellite address information, an EID of a first sub-area corresponding to an area currently covered by a satellite and a satellite device identifier SDID. In a possible implementation, the determining module 1501 determines a registration satellite from one or more satellites. For example, the determining module 1501 is configured to implement S104, S201, S304, S305, and S402.

The sending module 1502 is configured to send the user device address information. In a possible implementation, the sending module 1502 is further configured to send a registration request message, where the registration request message includes the user device address information. In a possible implementation, the sending module 1502 is further configured to send a data message, where the data message includes the user device address information. For example, the sending module 1502 is configured to implement S202, S306. S403, and S502.

Optionally, the communications apparatus 1500 further includes a receiving module 1503, configured to receive satellite address information sent by a first satellite. In a possible implementation, the receiving module 1503 is further configured to receive a beacon message sent by the first satellite, where the beacon message includes the satellite address information. In a possible implementation, the receiving module 1503 is further configured to receive a registration response message sent by the first satellite. In a possible implementation, the receiving module 1503 is further configured to receive an acknowledgement message or a data message fed back by the first satellite. For example, the receiving module is configured to implement S103, S303, S309, S404, and S503.

Figure 16:
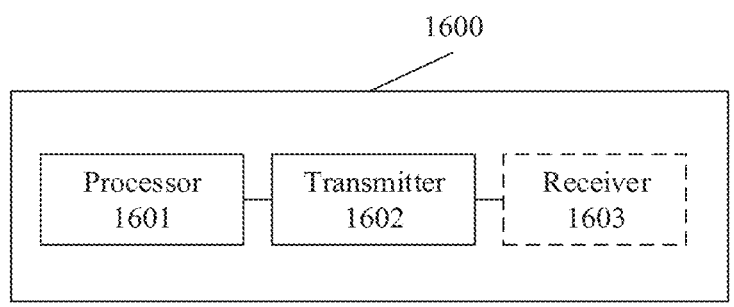
FIG. 16 shows another communications apparatus on a user device side according to an embodiment of this application.

An embodiment of this application further provides a communications apparatus. The communications apparatus may be applied to a user device side, and may be configured to implement the methods and steps related to the user device in the foregoing embodiments. The user device may be a communications apparatus located in the ground segment shown in FIG. 1, for example, a user terminal, a satellite UE, a cellular UE, a ground station, a cellular base station, or an access point. The communications apparatus may be a user device, or may be a chip in a user device. As shown in FIG. 16, the communications apparatus 1600 includes a processor 1601 and a transmitter 1602. Optionally, the communications apparatus 1600 further includes a receiver 1603.

The processor 1601 may be configured to determine user device address information of a user device, where the user device address information includes a second sub-area identifier EID and a user device identifier UDID of the user device, and the second EID is used to indicate a second sub-area in which the user device is currently located. In a possible implementation, the processor 1601 is further configured to determine, based on satellite address information, an EID of a first sub-area corresponding to an area currently covered by a satellite and a satellite device identifier SDID. In a possible implementation, the processor 1601 determines a registration satellite from one or more satellites. For example, the processor 1601 is configured to implement S104, S201, S304, S305, and S402.

The transmitter 1602 is configured to send the user device address information. In a possible implementation, the transmitter 1502 is further configured to send a registration request message, where the registration request message includes the user device address information. In a possible implementation, the transmitter 1602 is further configured to send a data message, where the data message includes the user device address information. For example, the transmitter 1602 is configured to implement S202, S306, S403, and S502.

Optionally, the communications apparatus 1600 further includes a receiver 1603, configured to receive satellite address information sent by a first satellite. In a possible implementation, the receiver 1603 is further configured to receive a beacon message sent by the first satellite, where the beacon message includes the satellite address information. In a possible implementation, the receiver 1603 is further configured to receive a registration response message sent by the first satellite. In a possible implementation, the receiver 1603 is further configured to receive an acknowledgement message or a data message fed back by the first satellite. For example, the receiver is configured to implement S103, S303, S309, S404, and S503.

An embodiment of this application further provides a communications apparatus. The communications apparatus may be applied to a user device side, and may be configured to implement the methods and steps related to the user device in the foregoing embodiments. The user device may be a communications apparatus located in the ground segment shown in FIG. 1, for example, a user terminal, a satellite UE, a cellular UE, a ground station, a cellular base station, or an access point. The communications apparatus may be a user device, or may be a chip in a user device.

Figure 17:
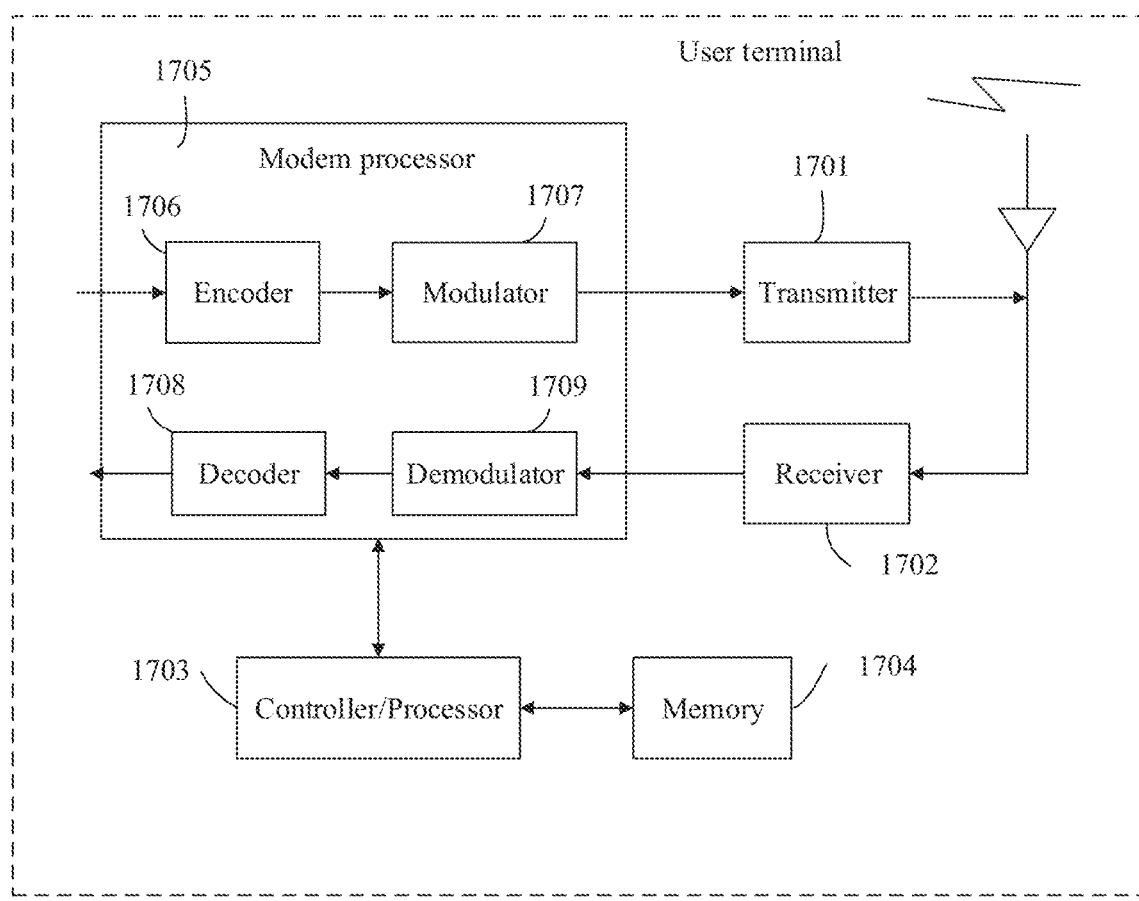
FIG. 17 shows still another communications apparatus on a user device side according to an embodiment of this application.

In an example, the user device is a terminal device. FIG. 17 shows a simplified schematic diagram of a possible designed structure of the user device in the foregoing embodiments. The user device includes a transmitter 1701, a receiver 1702, a controller/processor 1703, a memory 1704, and a modem processor 1705.

The transmitter 1701 adjusts (for example, performs analog conversion, filtering, amplification, and up-conversion on) an output sample and generates an uplink signal. The uplink signal is transmitted to the satellite in the foregoing embodiments through an antenna. On a downlink, the antenna receives a downlink signal transmitted by the satellite in the foregoing embodiments. The receiver 1702 adjusts (for example, performs filtering, amplification, down-conversion, and digitization on) a signal received from the antenna and provides an input sample. In the modem processor 1705, an encoder 1706 receives service data and a signaling message that are to be sent on a link (for example, the GSL/USL link shown in FIG. 1), and processes (for example, formats, encodes, and interleaves) the service data and the signaling message. A modulator 1707 further processes (for example, performs symbol mapping and modulation on) an encoded service data and an encoded signaling message and provides an output sample. A demodulator 1709 processes (for example, demodulates) the input sample and provides a symbol estimation. A decoder 1708 processes (for example, performs de-interleaving and decoding on) the symbol estimation and provides decoded data and a decoded signaling message that are to be sent to the UE. The encoder 1706, the modulator 1707, the demodulator 1709, and the decoder 1708 may be implemented by the combined modem processor 1705.

The controller/processor 1703 controls and manages an action of the user device and is configured to perform processing implemented by the user device in the foregoing embodiments. For example, the controller/processor 1703 is configured to determine user device address information of the user device. Optionally, the controller/processor 1703 is further configured to determine, based on satellite address information, an EID of a first sub-area corresponding to an area currently covered by a satellite and a satellite device identifier SDID. Optionally, the controller/processor 1703 is further configured to determine a registration satellite from one or more satellites. For example, the controller/processor 1703 is configured to support the user device to implement S104, S201, S304, S305, and S402.

The memory 1704 is configured to store program code and data of the user device.

It may be understood that FIG. 17 shows only a simplified design of the user device. In actual application, the user device may include any quantity of transmitters, receivers, processors, controllers, memories, communications units, and the like, and all user devices that can implement this application shall fall within the protection scope of this application.

Figure 18:
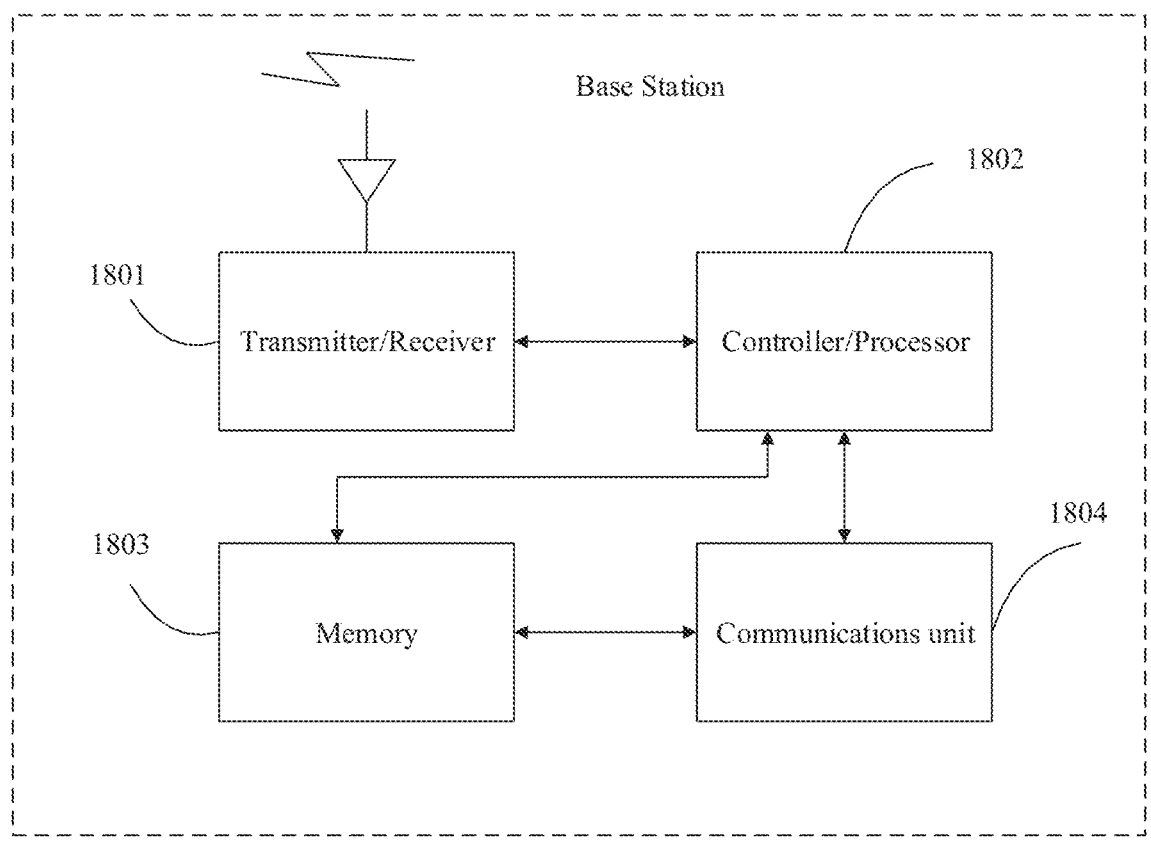
FIG. 18 shows still another communications apparatus on a user device side according to an embodiment of this application.

In another example, the user device is a base station. For example, the user device is a cellular base station or a ground station that can communicate with a satellite. FIG. 18 is a possible schematic structural diagram of the base station.

The base station includes a transmitter/receiver 1801, a controller/processor 1802, a memory 1803, and a communications unit 1804. The transmitter/receiver 1801 is configured to: support the base station to send/receive information to/from the satellite in the foregoing embodiments, and support a cellular UE to perform wireless communication with another cellular UE. The controller/processor 1802 performs various functions used for communication with the satellite. On a downlink, a signal from the satellite is received through an antenna, demodulated by the receiver 1801, and further processed by the controller/processor 1802 to restore service data and signaling information sent by the satellite. On an uplink, service data and a signaling message are processed by the controller/processor 1802, and demodulated by the transmitter 1801, to generate an uplink signal, and the uplink signal is transmitted to the satellite through the antenna. The controller/processor 1802 further performs processing processes of the user device in FIG. 3 to FIG. 11 and/or another process in the technology described in this application. The memory 1803 is configured to store program code and data of the base station. The communications unit 1804 is configured to support the base station to communicate with another network entity.

It may be understood that FIG. 18 shows only a simplified design of the base station. In actual application, the base station may include any quantity of transmitters, receivers, processors, controllers, memories, communications units, and the like, and all base stations that can implement the present invention shall fall within the protection scope of the present invention.

Figure 19:
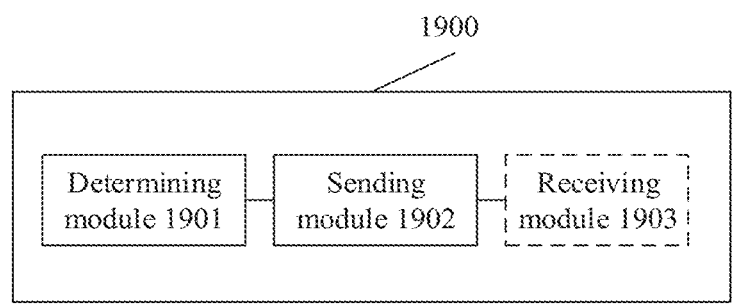
FIG. 19 shows a communications apparatus on a satellite side according to an embodiment of this application.

An embodiment of this application provides a communications apparatus. The communications apparatus may be applied to a satellite side, and may be configured to implement the methods and the steps related to the satellite in the foregoing embodiments. The communications apparatus may be a satellite located in the space segment shown in FIG. 1. Alternatively, the communications apparatus may be a chip in a satellite. As shown in FIG. 19, the communications apparatus 1900 includes a determining module 1901 and a sending module 1902. Optionally, the communications apparatus 1900 further includes a receiving module 1903.

The determining module 1901 may be configured to determine satellite address information of the satellite. In a possible implementation, the determining module 1901 is further configured to determine, based on address information of a user device, an EID of a second sub-area in which the user device is currently located and a user device identifier UDID. In a possible implementation, the determining module 1901 is further configured to determine whether a first sub-area is the same as the second sub-area. For example, the determining module 1901 is configured to implement S101, S204, S301, S317, and S602.

The sending module 1902 is configured to send the satellite address information. In a possible implementation, the sending module 1902 is further configured to send a beacon message, where the beacon message includes the satellite address information. In a possible implementation, the sending module 1902 is further configured to send a registration response message. In a possible implementation, the sending module 1902 is further configured to send a data message. In a possible implementation, the sending module 1902 is further configured to forward a registration request message to a neighbor satellite. For example, the sending module 1902 is configured to implement S102, S302, S327, S308, S607, and S605.

The receiving module 1903 is configured to receive user device address information sent by the user device. In a possible implementation, the receiving module 1903 is further configured to receive a registration request message sent by the user device, where the registration request message includes the user device address information. In a possible implementation, the receiving module 1903 is further configured to receive a data message or an acknowledgement message sent by the user device. In a possible implementation, the receiving module 1903 is further configured to receive an acknowledgement message or a data message sent by another satellite. For example, the receiving module is configured to implement S203, S307, S347, S601, S608, and S604.

Figure 20:
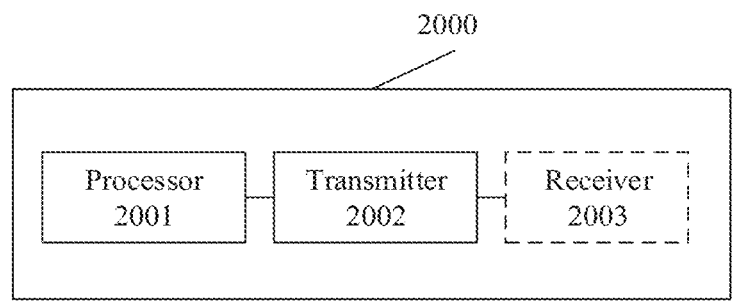
FIG. 20 shows another communications apparatus on a satellite side according to an embodiment of this application.

An embodiment of this application further provides a communications apparatus. The communications apparatus may be applied to a satellite side, and may be configured to implement the methods and steps related to the satellite in the foregoing embodiments. The satellite may be a communications apparatus located in the ground segment shown in FIG. 1. The communications apparatus may be a satellite, or may be a chip in a satellite. As shown in FIG. 20, the communications apparatus 2000 includes a processor 2001 and a transmitter 2002. Optionally, the communications apparatus 2000 further includes a receiver 2003.

Optionally, the communications apparatus 2000 further includes a receiver 2003.

The processor 2001 may be configured to determine satellite address information of a satellite. In a possible implementation, the processor 2001 is further configured to determine, based on address information of the user device, an EID of a second sub-area in which the user device is currently located and a user device identifier UDID. In a possible implementation, the processor 2001 is further configured to determine whether a first sub-area is the same as the second sub-area. For example, the processor 2001 is configured to implement S101, S204, S301, S317, and S602.

The transmitter 2002 is configured to send the satellite address information. In a possible implementation, the transmitter 2002 is further configured to send a beacon message, where the beacon message includes the satellite address information. In a possible implementation, the transmitter 2002 is further configured to send a registration response message. In a possible implementation, the transmitter 2002 is further configured to send a data message. In a possible implementation, the transmitter 2002 is further configured to forward a registration request message to a neighbor satellite. For example, the transmitter 2002 is configured to implement S102, S302, S327, S308, S607, and S605.

The receiver 2003 is configured to receive user device address information sent by the user device. In a possible implementation, the receiver 2003 is further configured to receive a registration request message sent by the user device, where the registration request message includes the user device address information. In a possible implementation, the receiver 2003 is further configured to receive a data message or an acknowledgement message sent by the user device. In a possible implementation, the receiver 2003 is further configured to receive an acknowledgement message or a data message sent by another satellite. For example, the receiver is configured to implement S203, S307, S347, S601, S608, and S604.

It should be noted that, in the foregoing embodiments, the action "send" may also mean "provide" or "output" and the action "receive" may also mean "obtain" or "input".

An embodiment of this application further provides a computer storage medium. The computer-readable storage medium stores an instruction, and the instruction may be executed by one or more processors of a processing circuit. When the instruction is run on a computer, the computer is enabled to perform the methods in the foregoing embodiments.

An embodiment of this application further provides a chip system. The chip system includes a processor, configured to support a distributed unit, a centralized unit, and a satellite or a user device to implement functions in the foregoing embodiments, for example, generating or processing data and/or information in the foregoing methods.

In a possible design, the chip system may further include a memory. The memory is configured to store a program instruction and data that are necessary for the distributed unit, the centralized unit, and the satellite or the user device. The chip system may include a chip, or may include a chip and another discrete component.

An embodiment of this application further provides a chip, including a processor. The processor is configured to invoke, from a memory, an instruction and run the instruction stored in the memory, to enable a communications device on which the chip is installed to perform the methods in the foregoing embodiments.

An embodiment of this application further provides another chip, including an input interface, an output interface, a processor, and a memory. The input interface, the output interface, the processor, and the memory are connected through an internal connection path. The processor is configured to execute code in the memory. When the code is executed, the processor is configured to perform the methods in the foregoing examples.

An embodiment of this application further provides another chip. The chip may be a part of a user device or a satellite device. The chip includes an input interface, an output interface, and a circuit. The input interface, the output interface, and the circuit are connected through an internal connection path. The circuit is configured to perform the methods in the foregoing embodiments.

An embodiment of this application further provides a processor, configured to be coupled to a memory. The processor is configured to perform the method and the functions related to the satellite or the user device in any one of the foregoing embodiments.

An embodiment of this application further provides a computer program product including an instruction. When the computer program product runs on a computer, the computer is enabled to perform the method and the functions of the satellite or the user device in any one of the foregoing embodiments.

An embodiment of this application further provides a communications system. The system includes the satellite and at least one user device in the foregoing embodiments.

An embodiment of this application further provides an apparatus, configured to implement the methods in the foregoing embodiments.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions in this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive SolidState Disk), or the like.

What is claimed is:

1. A satellite network communication method, comprising:
   determining, by a user device, address information of the user device, wherein the address information comprises a second sub-area identifier and a user device identifier (UDID) of the user device, and wherein the second sub-area identifier indicates a second sub-area which the user device is currently located in and is one of a plurality of sub-areas divided from earth surface; and
   in response to determining the address information, sending, by the user device, the address information to a first satellite.

2. The method according to claim 1, wherein the method comprises:
   receiving, from the first satellite by the user device, satellite address information, wherein the satellite address information comprises a first sub-area identifier and a satellite device identifier (SDID), and wherein the first sub-area identifier indicates a first sub-area which corresponds to an area currently covered by the first satellite and is one of the plurality of sub-areas, and the satellite device identifier indicates a network interface of the first satellite for communication between the first satellite and the user device.

3. The method according to claim 2, wherein the satellite address information is carried in a beacon message, and wherein receiving the satellite address information comprises:
   receiving, from the first satellite by the user device, the beacon message; and wherein sending the address information comprises:
   sending, to the first satellite by the user device, a registration request message, wherein the registration request message carries the address information; and wherein the method further comprises: receiving, from the first satellite by the user device, a registration response message, wherein the registration response message responds to the registration request message.

4. The method according to claim 3, wherein sending the registration request message comprises:
   in response to the first sub-area identifier of the first satellite being the same as the second sub-area identifier of the user device, sending, by the user device, the registration request message to the first satellite; or
   in response to an elevation angle between the first satellite and the user device being greater than a first threshold or reaching a maximum value, sending, by the user device, the registration request message to the first satellite.

5. The method according to claim 1, wherein the plurality of sub-areas are obtained through division based on at least one of a quantity of satellite orbits or a quantity of satellites in each orbit.

6. The method according to claim 5, wherein the quantity of satellite orbits is M, the quantity of satellites in each orbit is N, one orbit corresponds to N sub-areas, and a quantity of the plurality of sub-areas is M×N.

7. The method according to claim 6, wherein each sub-area has a longitude range with a size of 180°/M and a latitude range with a size of 180°/N.

8. The method according to claim 6, wherein sub-area identifiers of N sub-areas corresponding to the one orbit in the plurality of sub-areas are consecutive positive integers, or an arithmetic sequence with a common difference d, wherein the common difference d is an integer greater than 1.

9. A satellite network communication method, comprising:
   determining, by a first satellite, satellite address information, wherein the satellite address information comprises a first sub-area identifier which indicates a first sub-area corresponding to an area currently covered by the first satellite, and the first sub-area is one of a plurality of sub-areas divided from earth surface; and
   in response to determining the satellite address information, sending, by the first satellite, the satellite address information to a user device.

10. The method according to claim 9, wherein the satellite address information comprises a satellite device identifier of the first satellite which indicates a network interface of the first satellite for communication between the first satellite and the user device.

11. The method according to claim 9, wherein the plurality of sub-areas are obtained through division based on at least one of a quantity of satellite orbits or a quantity of satellites in each orbit.

12. The method according to claim 11, wherein the quantity of satellite orbits is M, the quantity of satellites in each orbit is N, one orbit corresponds to N sub-areas, and a quantity of the plurality of sub-areas is M×N.

13. The method according to claim 12, wherein each sub-area has a longitude range with a size of 180°/M and a latitude range with a size of 180°/N.

14. The method according to claim 9, wherein determining the satellite address information comprises:
   determining the first sub-area identifier of the first sub-area based on a mapping relationship between a satellite identifier of the first satellite and sub-area identifiers of the plurality of sub-areas, wherein the satellite identifier of the first satellite identifies the first satellite.

15. The method according to claim 14, wherein the mapping relationship comprises:

$$EID_t = \left\{ \text{int}(SID/N) * N + \left[ SID + \text{int}\left( t * \frac{N}{T} \right) \bmod N \right] \bmod N \right\}$$

wherein $EID_t$ represents the first sub-area identifier of the first sub-area corresponding to the area currently covered by the first satellite, SID is the satellite identifier of the first satellite, SID is equal to an EID of a sub-area corresponding to an area initially covered by the first satellite, N represents a quantity of satellites in an orbit which the satellite is located in, T represents a revolution period of the first satellite, int represents a rounding operation, and mod represents a modulo operation.

16. The method according to claim 9, wherein the satellite address information is carried in a beacon message, and wherein sending the satellite address information comprises:
   sending, to the user device by the first satellite, the beacon message; and wherein the method comprises:
      receiving, from the user device by the first satellite, a registration request message, wherein the registration request message comprises address information of the user device which comprises a second sub-area identifier and a user device identifier (UDID) of the user device, and the second sub-area identifier indicates a second sub-area which the user device is currently located in; and
      sending, to the user device by the first satellite, a registration response message, wherein the registration response message responds to the registration request message.

17. The method according to claim 16, wherein the method comprises:
   in response to the second sub-area identifier being different from the first sub-area identifier, sending, to a second satellite by the first satellite, the registration request message, wherein the second sub-area is a sub-area corresponding to an area currently covered by the second satellite;
and wherein sending the registration response message comprises:
   receiving, from the second satellite by the first satellite, the registration response message; and
   forwarding, by the first satellite, the registration response message to the user device in the second sub-area.

18. A satellite network communications apparatus, comprising:
   at least one processor;
   one or more memories coupled to the at least one processor and storing programming instructions for execution by the at least one processor to:
      determine address information of a user device, wherein the address information comprises a second sub-area identifier and a user device identifier (UDID) of the user device, and wherein the second sub-area identifier indicates a second sub-area which the user device is currently located in and is one of a plurality of sub-areas divided from earth surface; and
   a transmitter, configured to send the address information to a first satellite in response to determining the address information.

19. The communications apparatus according to claim 18, wherein the apparatus comprises:
   a receiver, configured to receive satellite address information from the first satellite, wherein the satellite address information comprises a first sub-area identifier and a satellite device identifier (SDID), and wherein the first sub-area identifier indicates a first sub-area which corresponds to an area currently covered by the first satellite and is one of the plurality of sub-areas, and the satellite device identifier indicates a network interface of the first satellite for communication between the first satellite and the user device.

20. The communications apparatus according to claim 19, wherein the satellite address information is carried in a beacon message, and wherein the receiver is configured to:
   receive the beacon message from the first satellite; and wherein the transmitter is configured to:
   send a registration request message to the first satellite, wherein the registration request message carries the address information; and wherein the receiver is configured to:
   receive a registration response message from the first satellite, wherein the registration response message responds to the registration request message.

21. The communications apparatus according to claim 20, wherein the transmitter is configured to send the registration request message to the first satellite in response to the first sub-area identifier of the first satellite being the same as the second sub-area identifier of the user device, or an elevation angle between the first satellite and the user device being greater than a first threshold or reaching a maximum value.

22. The communications apparatus according to claim 18, wherein the plurality of sub-areas are obtained through division based on at least one of a quantity of satellite orbits or a quantity of satellites in each orbit.

23. The communications apparatus according to claim 22, wherein the quantity of satellite orbits is M, the quantity of satellites in each orbit is N, one orbit corresponds to N sub-areas, and a quantity of the plurality of sub-areas is M×N.

24. The communications apparatus according to claim 23, wherein each sub-area has a longitude range with a size of 180°/M and a latitude range with a size of 180°/N.

25. The communications apparatus according to claim 23, wherein sub-area identifiers of N sub-areas corresponding to the one orbit in the plurality of sub-areas are consecutive positive integers, or an arithmetic sequence with a common difference d, wherein the common difference d is an integer greater than 1.

26. A satellite network communications apparatus, comprising:
   at least one processor;
   one or more memories coupled to the at least one processor and storing programming instructions for execution by the at least one processor to:
   determine satellite address information, wherein the satellite address information comprises a first sub-area identifier which indicates a first sub-area corresponding to an area currently covered by a first satellite, and the first sub-area is one of a plurality of sub-areas divided from earth surface; and
   a transmitter, configured to:
   send the satellite address information to a user device in response to determining the satellite address information.

27. The communications apparatus according to claim 26, wherein the processor is executed to:
   determining the first sub-area identifier of the first sub-area based on a mapping relationship between a satellite identifier of the first satellite and sub-area identifiers of the plurality of sub-areas, wherein the satellite identifier of the first satellite identifies the first satellite.

28. The communications apparatus according to claim 27, wherein the mapping relationship comprises:

$$EID_t = \left\{ \operatorname{int}(SID/N) * N + \left[ SID + \operatorname{int}\left(t * \frac{N}{T}\right) \bmod N \right] \bmod N \right\}$$

wherein $EID_t$ represents the first sub-area identifier of the first sub-area corresponding to the area currently covered by the first satellite, SID is the satellite identifier of the first satellite, SID is equal to an EID of a sub-area corresponding to an area initially covered by the first satellite, N represents a quantity of satellites in an orbit which the satellite is located in, T represents a revolution period of the first satellite, int represents a rounding operation, and mod represents a modulo operation.

29. The communications apparatus according to claim 26, wherein the satellite address information is carried in a beacon message, and wherein the transmitter is configured to:
   send, to the user device, the beacon message; and wherein the apparatus comprises a receiver configured to:
   receive a registration request message from the user device, wherein the registration request message comprises address information of the user device which comprises a second sub-area identifier and a user device identifier (UDID) of the user device, and the second sub-area identifier indicates a second sub-area which the user device is currently located in; and wherein the transmitter is configured to:
   send a registration response message to the user device, wherein the registration response message responds to the registration request message.

30. The communications apparatus according to claim 29, wherein the receiver is configured to:
   in response to the second sub-area identifier being different from the first sub-area identifier, send the registration request message to a second satellite, wherein the second sub-area is a sub-area corresponding to an area currently covered by the second satellite; and wherein the receiver is configured to:
   receive the registration response message from the second satellite; and wherein the transmitter is configured to:
   forward the registration response message to the user device in the second sub-area.

* * * * *